(12) United States Patent
Ceja

(10) Patent No.: US 12,091,073 B2
(45) Date of Patent: Sep. 17, 2024

(54) EXPANDABLE HAND TRUCK

(71) Applicant: Jose Ceja, Chino, CA (US)

(72) Inventor: Jose Ceja, Chino, CA (US)

(*) Notice: Subject to any disclaimer, the term of this patent is extended or adjusted under 35 U.S.C. 154(b) by 500 days.

(21) Appl. No.: 17/543,692

(22) Filed: Dec. 6, 2021

(65) Prior Publication Data

US 2022/0089206 A1 Mar. 24, 2022

Related U.S. Application Data

(63) Continuation-in-part of application No. 17/180,637, filed on Feb. 19, 2021, now Pat. No. 11,192,566.

(60) Provisional application No. 62/979,377, filed on Feb. 20, 2020, provisional application No. 63/068,679, filed on Aug. 21, 2020.

(51) Int. Cl.
   *B62B 3/02* (2006.01)
(52) U.S. Cl.
   CPC ...................... *B62B 3/02* (2013.01)
(58) Field of Classification Search
   CPC ...................................................... B62B 3/02
   See application file for complete search history.

(56) References Cited

U.S. PATENT DOCUMENTS

| | | | | |
|---|---|---|---|---|
| 1,418,754 A | * | 6/1922 | Vangiesen | B62B 1/18 296/10 |
| 1,631,333 A | * | 6/1927 | Privat | B62B 1/18 296/10 |
| 4,281,849 A | * | 8/1981 | Chandick | B62B 1/12 280/655 |
| 4,505,495 A | * | 3/1985 | Foss | B62B 3/02 16/113.1 |
| 4,726,602 A | * | 2/1988 | Sanders | B62B 1/12 280/654 |
| 5,465,987 A | * | 11/1995 | DellaVecchia | B62B 1/14 D34/28 |
| 6,102,433 A | * | 8/2000 | Stevens | B62B 1/125 280/646 |
| 6,733,026 B1 | * | 5/2004 | Robberson | B62B 3/007 280/30 |

(Continued)

FOREIGN PATENT DOCUMENTS

| | | |
|---|---|---|
| CA | 2762543 A1 | 6/2012 |
| EP | 1961692 A2 | 8/2008 |
| JP | 2019069737 A | 5/2019 |

OTHER PUBLICATIONS

Connecta Trolley—Connecting Furniture Moving Platform Warehouse Dolly Board, Sep. 28, 2022, 1 page, Retrieved from the Internet <https://www.ebay.com.au/itm/183427663247> [retrieved on Nov. 29, 2022].

(Continued)

*Primary Examiner* — Bryan A Evans
(74) *Attorney, Agent, or Firm* — LOZA & LOZA, LLP; Kevin L. Soules

(57) ABSTRACT

A hand truck having a plurality of hingeably engaged sides that is expandable from a closed position dimensioned to fit through a standard doorway, to an open position to form a movable platform having a swing out support frame having an upper end hingedly attached to the rear side of the center frame which is movable between an extended position and a stored position. A corresponding sofa dolly and a platform enclosure is also disclosed.

20 Claims, 17 Drawing Sheets

(56) References Cited

U.S. PATENT DOCUMENTS

| | | | | |
|---|---|---|---|---|
| 7,360,784 | B2* | 4/2008 | Stewart | B60J 7/1614 |
| | | | | 280/30 |
| 7,909,148 | B1* | 3/2011 | Miller | A47B 11/00 |
| | | | | 280/30 |
| 8,088,984 | B2* | 1/2012 | Meyer | G10G 7/005 |
| | | | | 84/421 |
| 8,191,907 | B2* | 6/2012 | Watson | B62B 3/007 |
| | | | | 280/30 |
| 9,421,835 | B2* | 8/2016 | Kao | A63C 17/265 |
| 2018/0222511 | A1 | 8/2018 | Turner, Jr. | |
| 2020/0307665 | A1* | 10/2020 | Su | B62B 3/022 |

OTHER PUBLICATIONS

Interconnecting Dollies—Pack of 2, 2012-2022, 1 page, Retrieved from the Internet <https://www.bin-shop.co.uk/interconnecting-dollies-pack-of-2> [retrieved on Nov. 29, 2022].

* cited by examiner

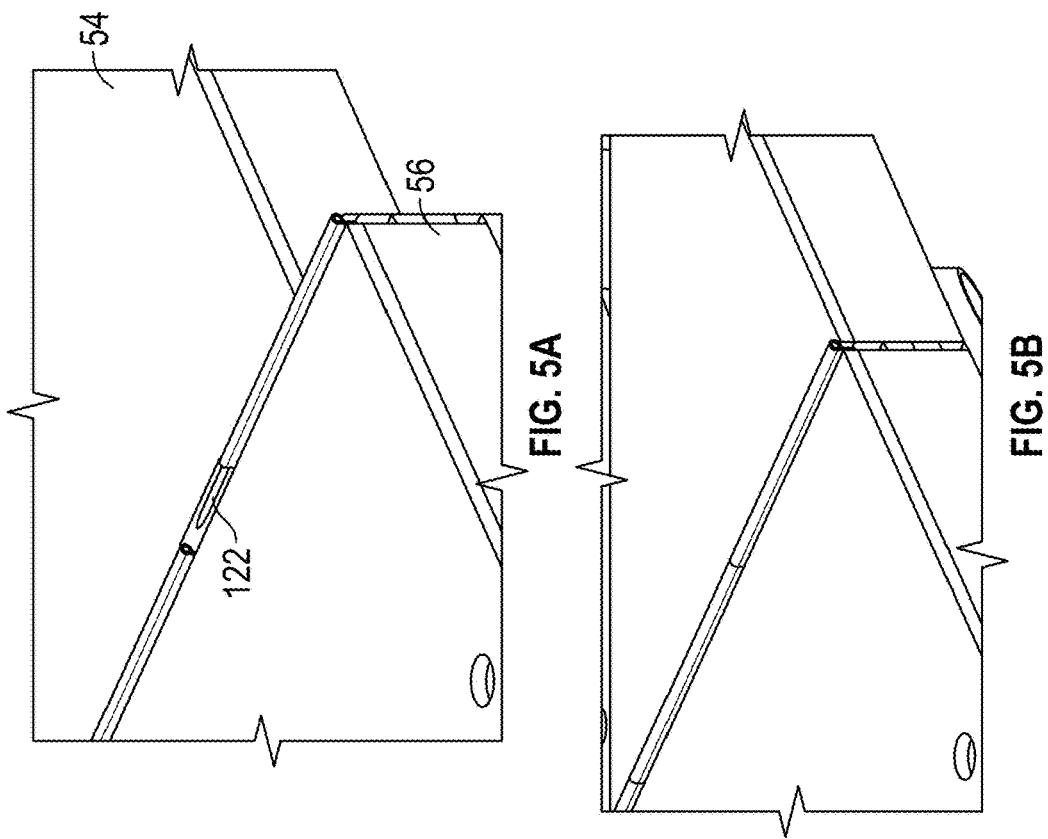
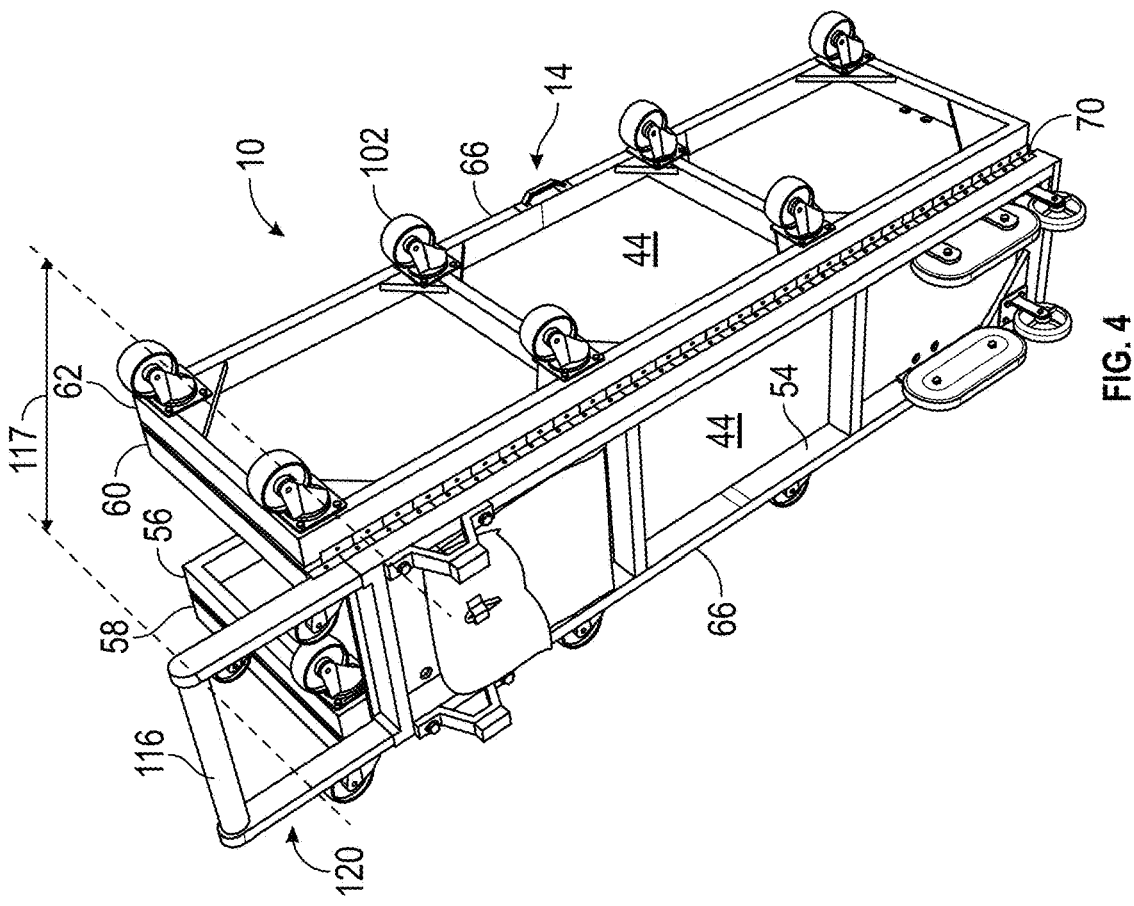

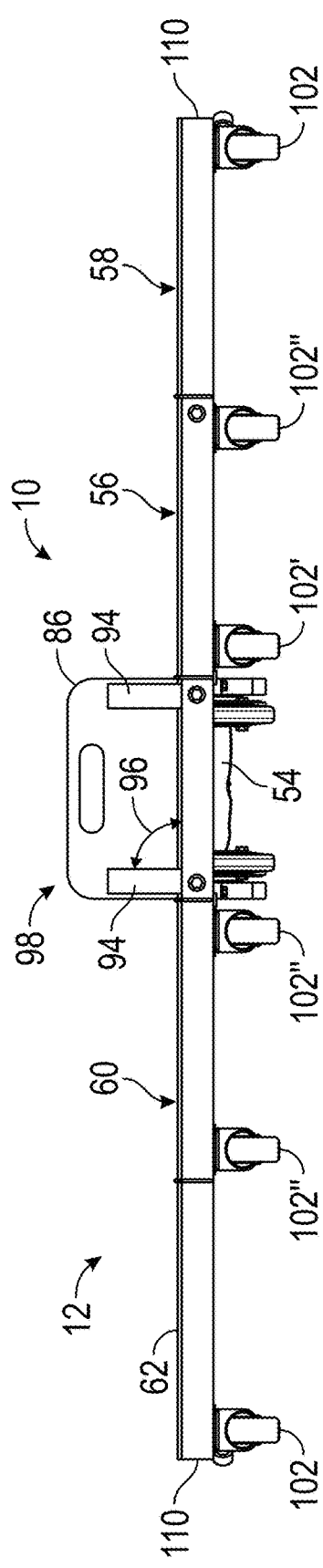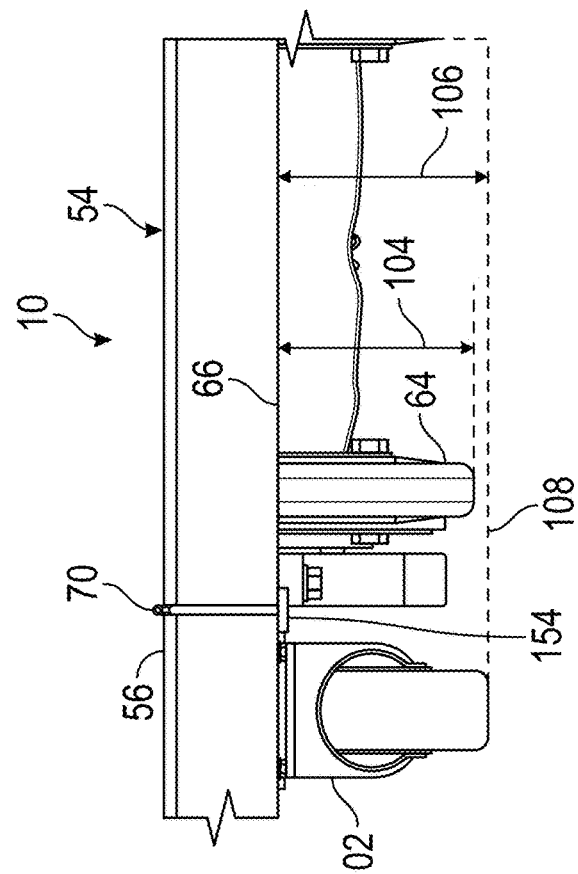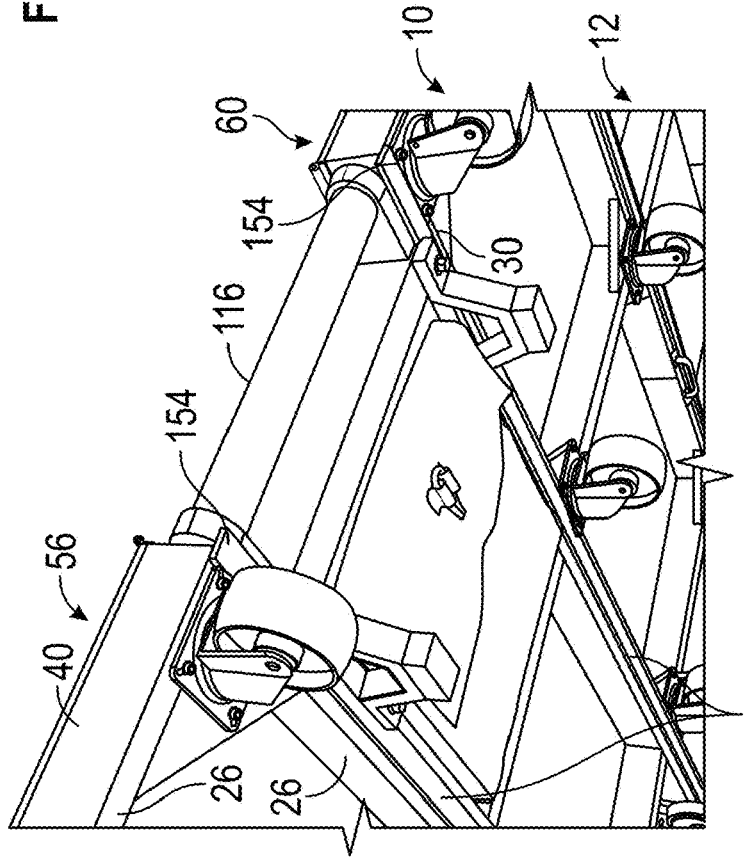

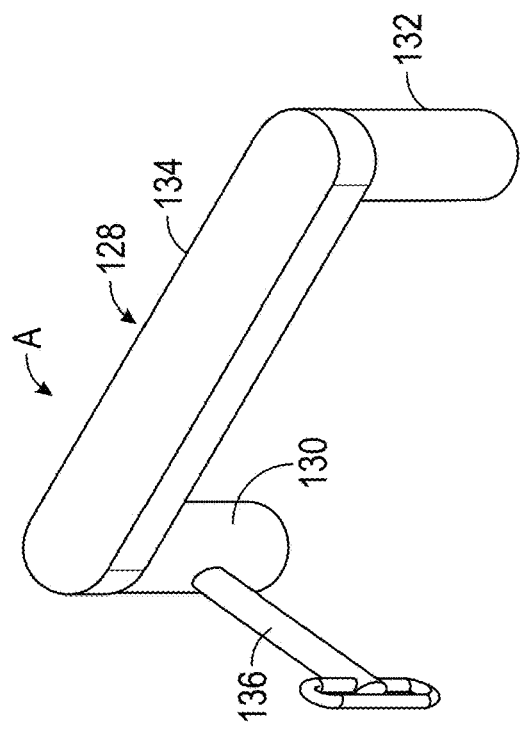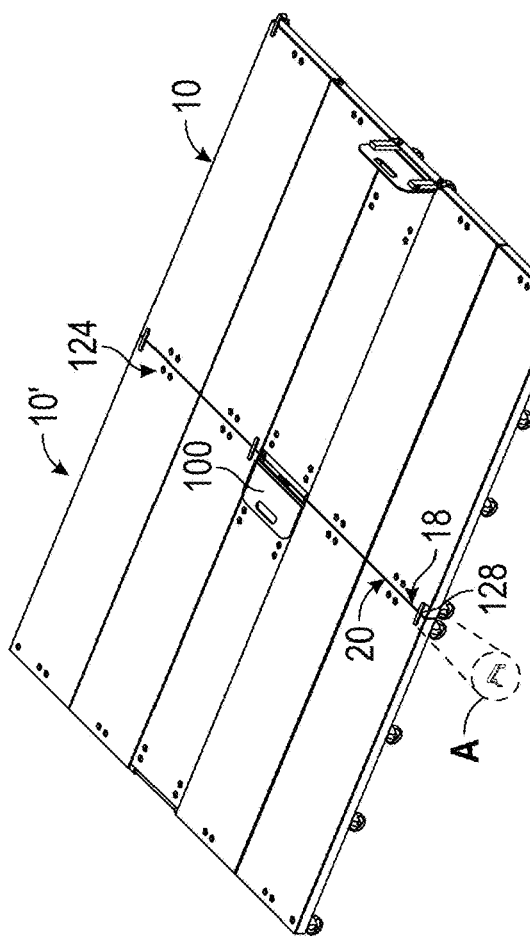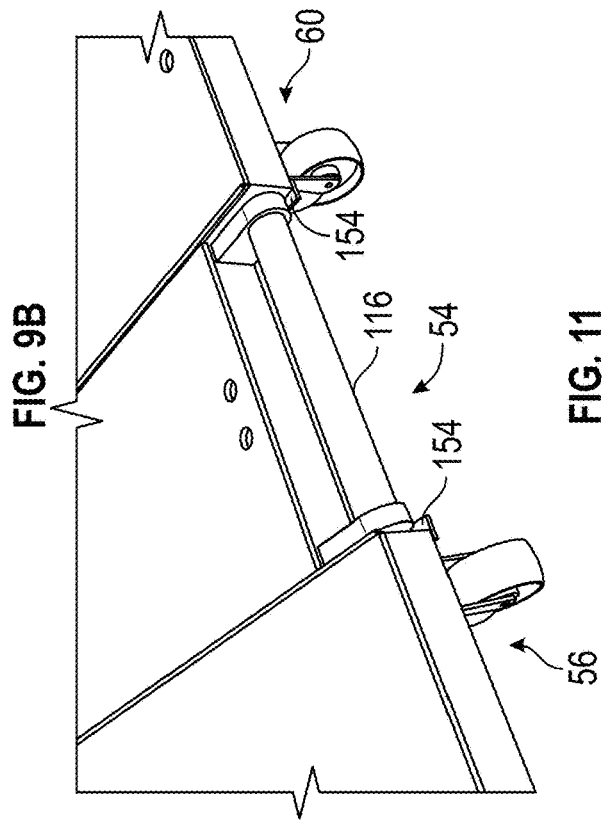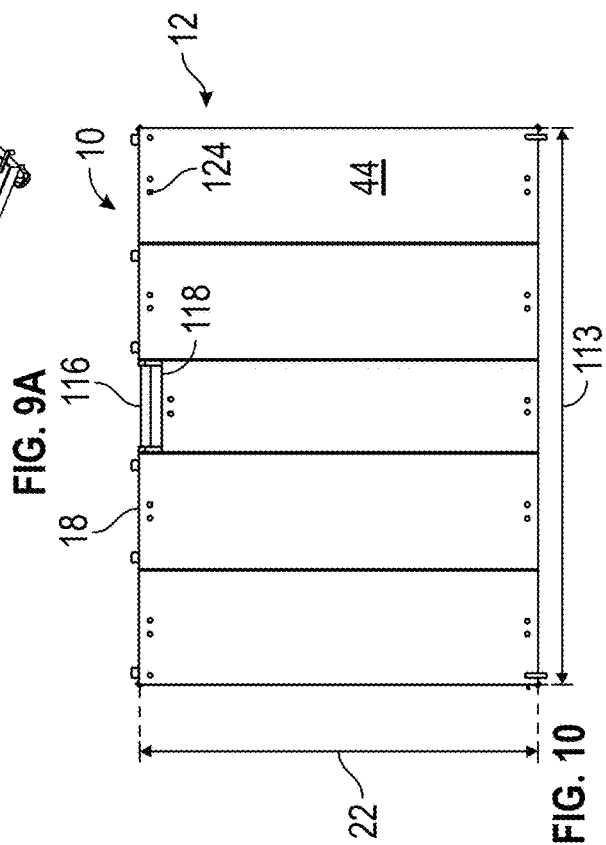

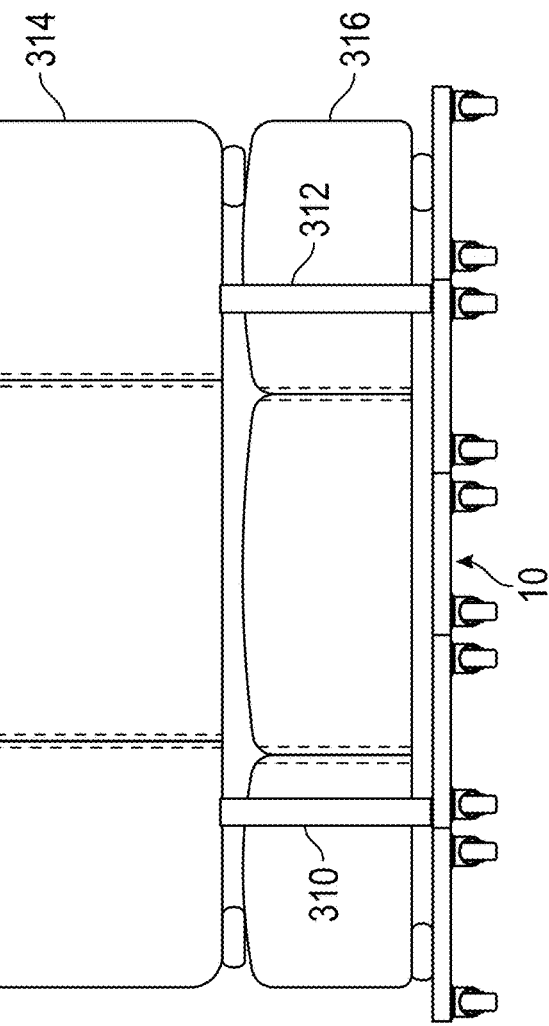
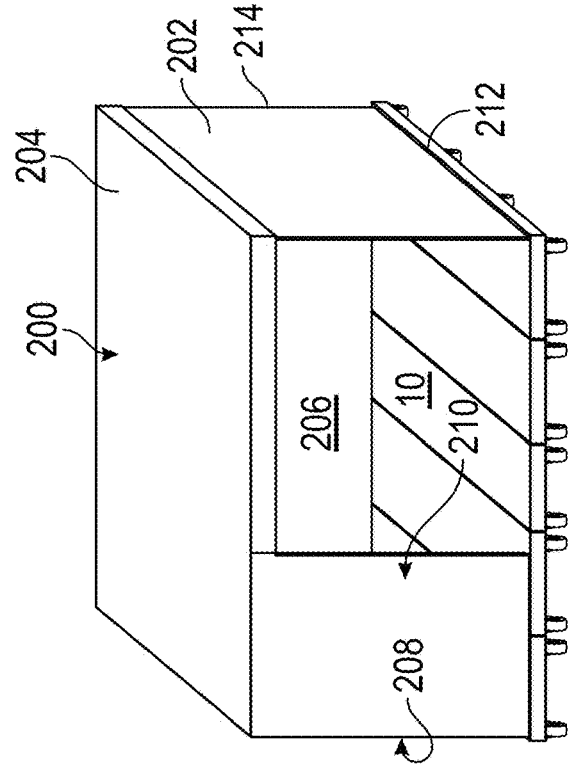
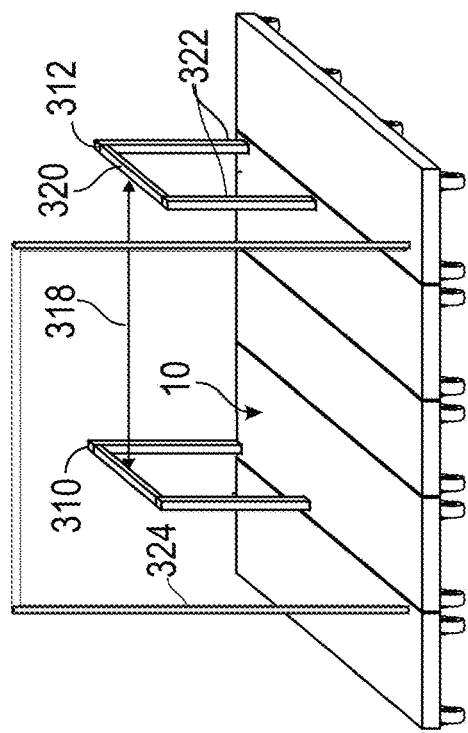

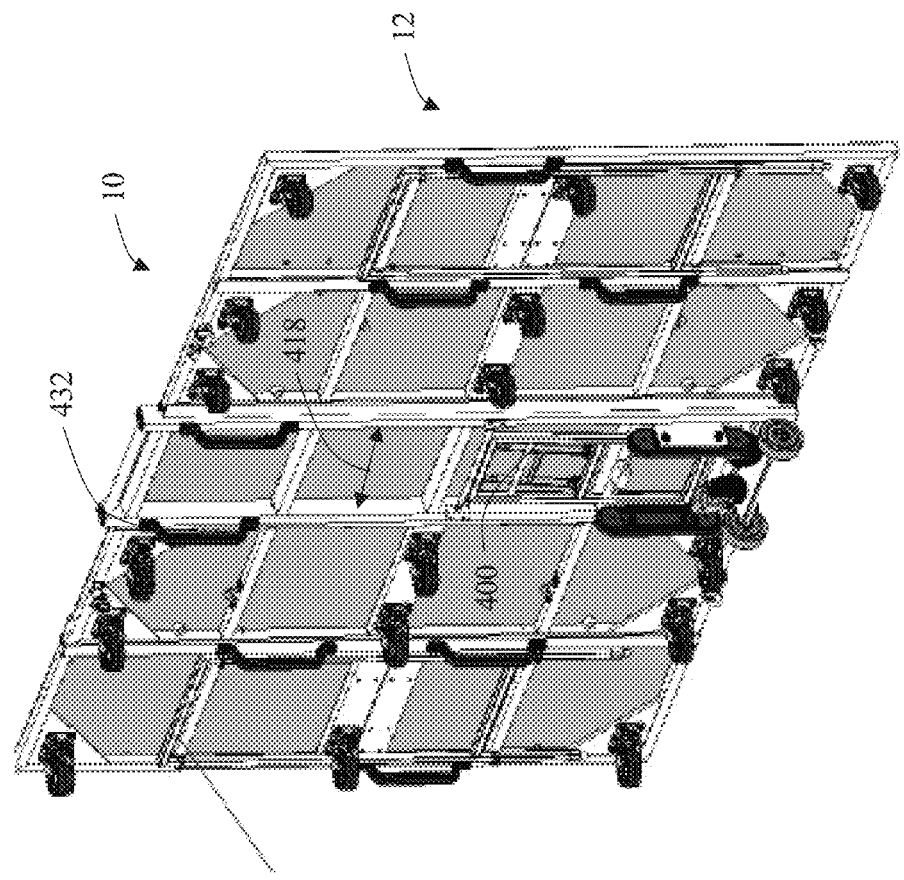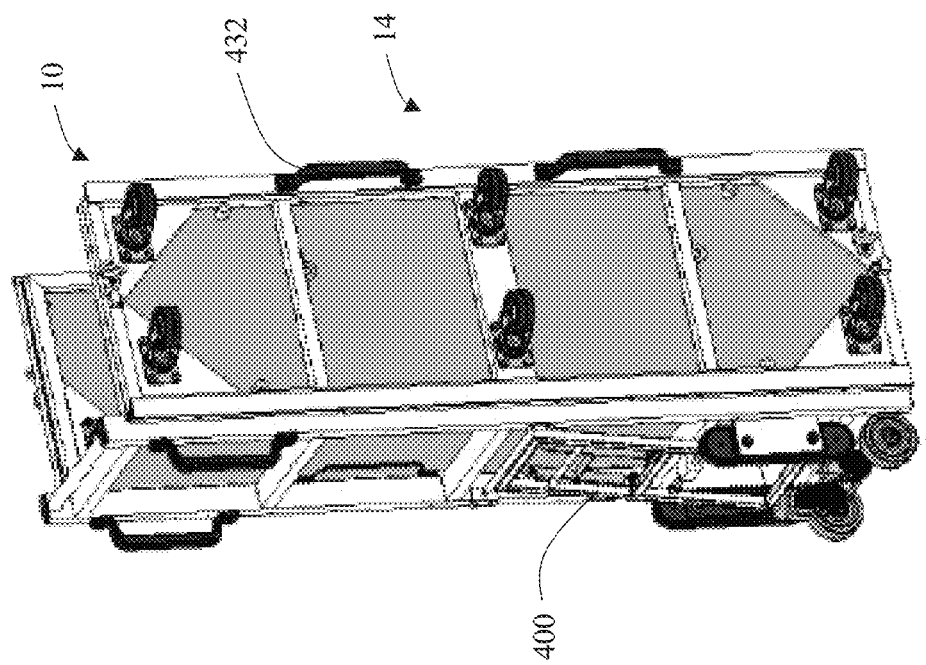

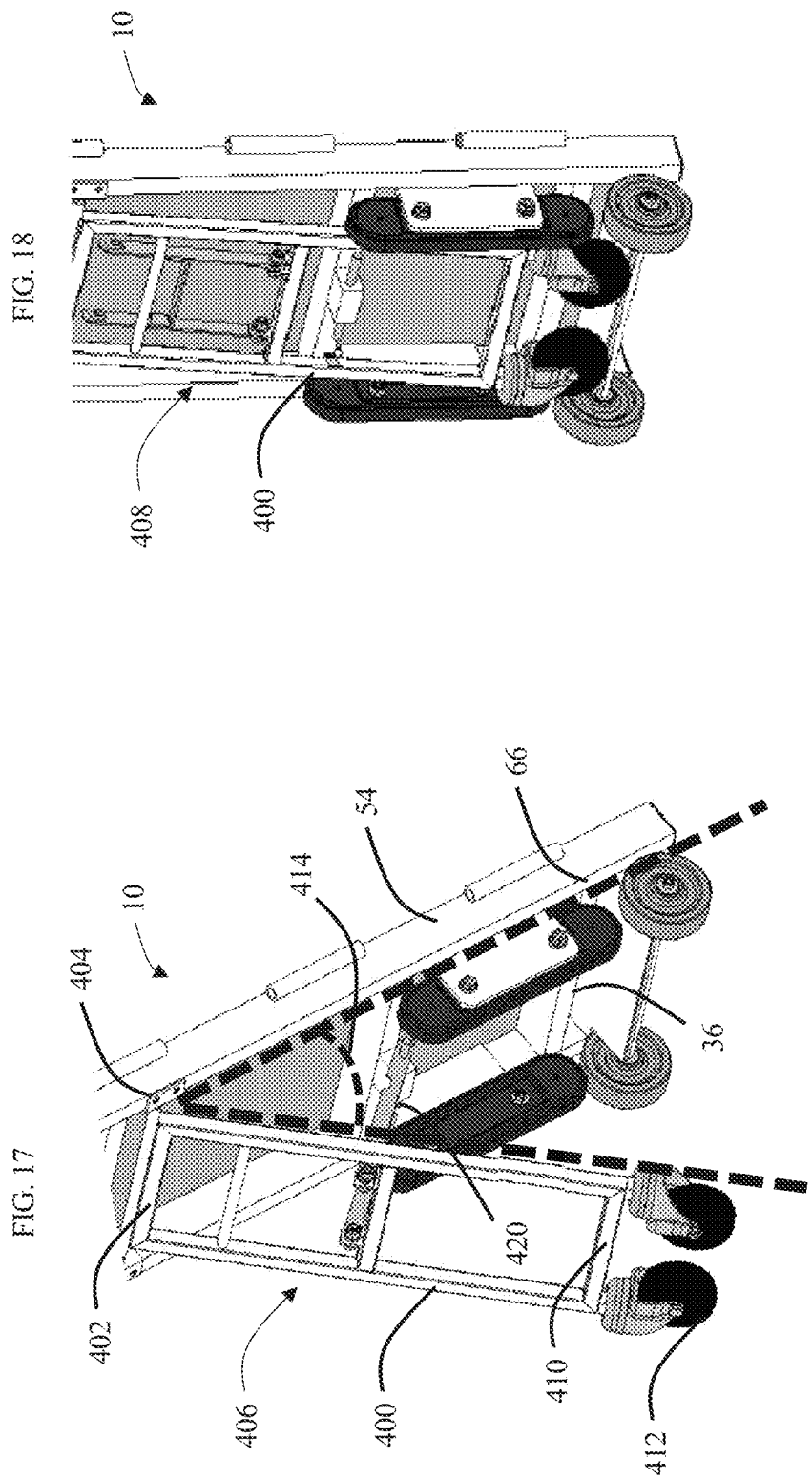

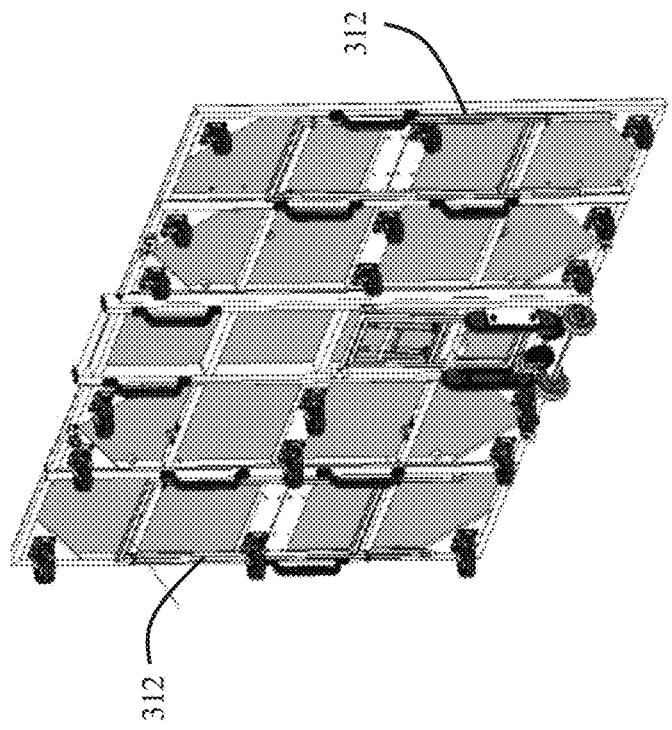
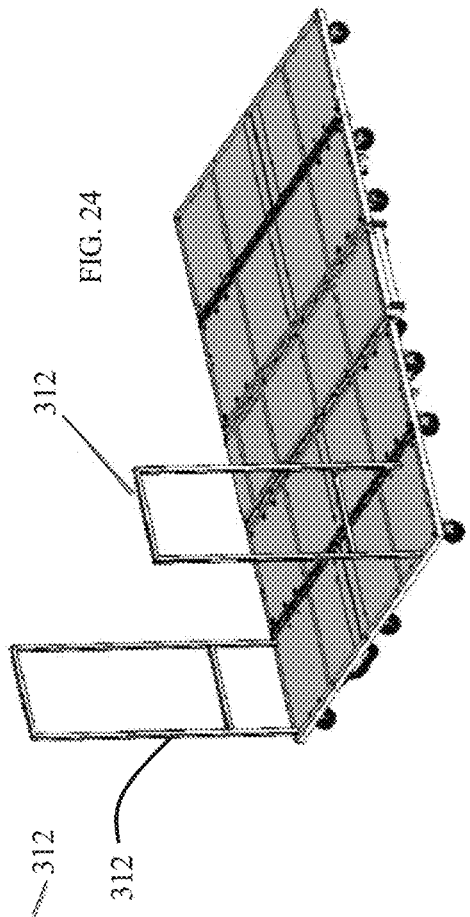
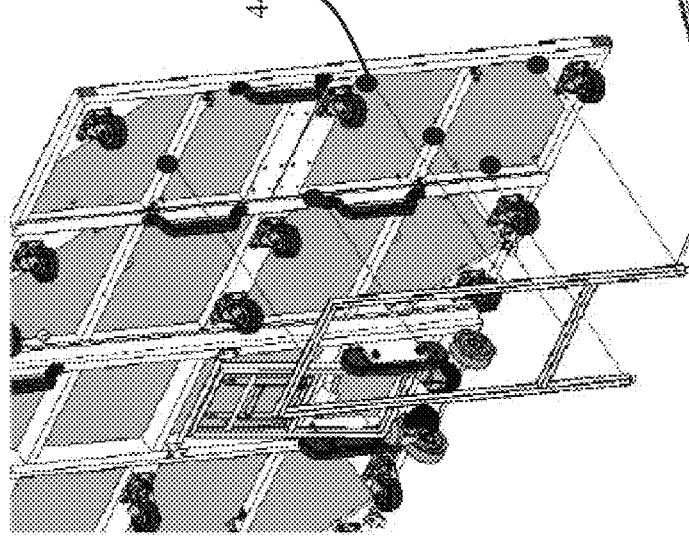

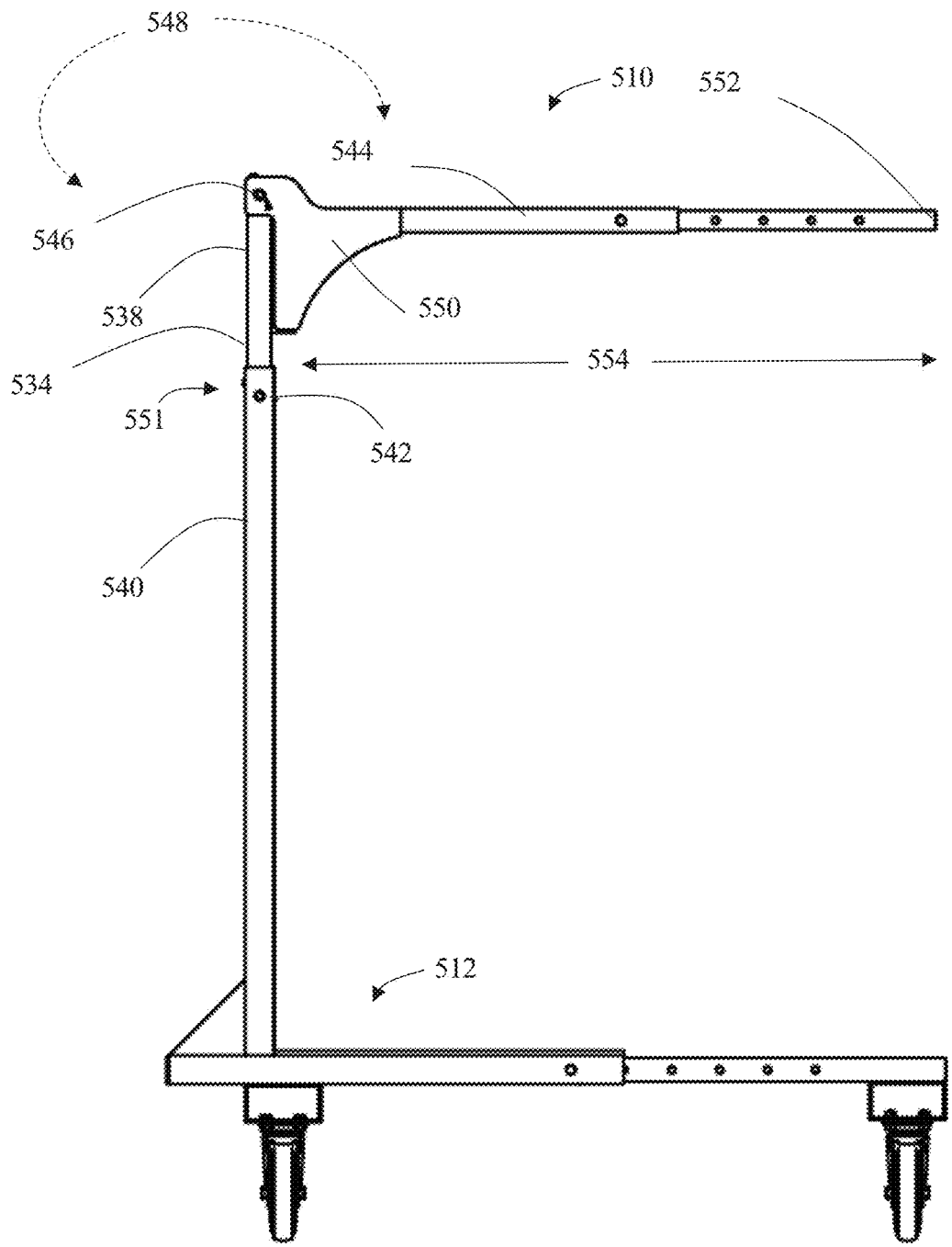

EXPANDABLE HAND TRUCK

RELATED APPLICATIONS

This application is a continuation in part of U.S. Pat. No. 11,192,566, filed Feb. 19, 2021 as U.S. patent application Ser. No. 17/180,637, which claims priority to U.S. Provisional patent application No. 62/979,377 filed Feb. 20, 2020, and U.S. Provisional patent application No. 63/068,679 filed Aug. 21, 2020, the entire contents of which are fully incorporated by reference herein.

FIELD

Various embodiments of the invention pertain to a hand truck expandable into a platform. Preferably, a movable platform having a closed position which can fit through a standard doorway and an open position which provides the storage platform.

BACKGROUND

Hand trucks have long been used for quickly and easily moving heavy and/or bulky loads. Typically, a hand truck has an upright frame and is constructed to provide strength with minimal weight. A wheel assembly is attached to the lower or bottom end of the frame, typically with brackets for holding an axle to which the wheels are attached, and/or using individual wheels attached to the frame. Hand trucks also typically include a forward extending lift plate, also known in the art as a nose plate, to a front side of the frame at the lower end. Most hand trucks further include a handle attached to the frame at the upper end suitable for grasping, maneuvering, and propelling the hand truck. Importantly, hand trucks must be limited in width so that they are capable of fitting through typically sized doorways, the minimum doorway size being 24". While hand trucks are useful for moving items, hand trucks are typically not wide enough to support items once moved.

EP 1,961,692 is directed to a hand truck having an expandable load bed or deck in which a central rack flanked by a pair of movable sections expands for transporting wide loads with stability.

CA 2,762,543 is directed to a hand truck having a second set of wheels proximate to the handle to allow movement of the hand truck when the frame is parallel to a floor or other supporting surface.

U.S. Pat. No. 4,726,602 to Sanders, U.S. Pat. No. 1,418,754 to Vangiesen, U.S. Pat. No. 6,102,433 to Stevens, U.S. Pat. No. 5,465,987 to Della, and U.S. Pat. No. 7,163,213 to Vecchia are directed to various types of hand trucks. Vecchia is directed to a hand truck having a second set of wheels proximate to the handle to allow movement of the hand truck when the frame is parallel to a floor or other supporting surface, which is further equipped with an electric motor.

U.S. Pat. No. 8,100,430 is directed to a multi-mode hand truck convertible to assume a hand-truck mode, a reclined load-assist mode, and a push-cart mode.

However, relocation of an item using a hand truck, e.g., for renovation or repair of the structure in which the item is located, requires the item to be moved using a hand truck from location to location. There is a need in the art to provide a hand truck which allows for movable storage of an item.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, A hand truck comprises a plurality of frames, each defining a top end separated from a bottom end by a height; a first side comprising a first side member separated from a second side comprising a second side member by a width, and further comprising at least one cross member extending between the first side member and the second side member; a deck attached to a front side of one or more of the first side, the second side or the at least one cross member, dimensioned and arranged to cover at least a portion of the width and the height defined by the frame; wherein one of the plurality of frames forms a center frame and comprises a wheel assembly attached to a rear side of the center frame, proximate to the bottom end and comprising at least one wheel adapted to facilitate a rolling movement of the hand truck over an external surface; each of the remaining plurality of frames forming side frames, wherein the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame; wherein the second side of the center frame is hingedly attached to a first side of a third side frame; moveable between an open position and a closed position such that in the open position, the deck of the center frame is essentially coplanar with a deck of the third side frame, and in the closed position the deck of the center frame is non-coplanar with the deck of the third side frame; a swing out support frame having an upper end hingedly attached to the rear side of the center frame which is movable between an extended position and a stored position; the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.

In another embodiment, a hand truck comprises a plurality of frames, each defining a top end separated from a bottom end by a height; each frame comprising a first side comprising a first side member separated from a second side comprising a second side member by a width, and further comprising at least one cross member extending between the first side member and the second side member, and a deck attached to a front side of one or more of the first side, the second side or the at least one cross member, dimensioned and arranged to cover at least a portion of the width and the height defined by the frame; wherein one of the plurality of frames forms a center frame and comprises a wheel assembly attached to a rear side of the center frame, proximate to the bottom end and comprising at least one wheel adapted to facilitate a rolling movement of the hand truck over an external surface; the remaining plurality of frames each forming one of a plurality of side frames; wherein the first side of the center frame is hingedly attached to a second side of a first side frame and a first side of the first side frame is hingedly attached to a second side of a second side frame; wherein the second side of the center frame is hingedly attached to a first side of a third side frame and a second side of the third side frame is hingedly attached to a first side of a fourth side frame; wherein each of the side frames are moveable between an open position and a closed position such that in the open position, the deck of the center frame is essentially coplanar with the deck of each side frame, and in the closed position, the deck of the center frame is non-coplanar with the deck of each side frame; wherein each of the frames have a total height of greater than or equal to about 48 inches; and wherein the hand truck has a total width of less than or equal to about 30 inches when all of the side frames are in their respective closed positions, and wherein the hand truck has a total width of greater than or equal to about 70 inches when all of the side frames are in their respective open positions; a swing out support frame having an upper end hingedly attached to the rear side of the center frame which is movable between an extended position and a stored position; the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 20° and less than 45°, determined relative to the side members of the center frame.

In other embodiments, a hand truck comprises a plurality of frames, each defining a top end separated from a bottom end by a height; a first side comprising a first side member separated from a second side comprising a second side member by a width, and further comprising at least one cross member extending between the first side member and the second side member; a deck attached to a front side of one or more of the first side, the second side or the at least one cross member, dimensioned and arranged to cover at least a portion of the width and the height defined by the frame; wherein one of the plurality of frames forms a center frame and comprises a wheel assembly attached to a rear side of the center frame, proximate to the bottom end and comprising at least one wheel adapted to facilitate a rolling movement of the hand truck over an external surface; each of the remaining plurality of frames forming side frames, wherein the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame; and wherein a first side of the first side frame is hingedly attached to a second side of a second side frame movable between an open position and a closed position such that in the open position, the deck of the first side frame is essentially coplanar with a deck of the second side frame, and in the closed position, the deck of the first side frame is non-coplanar with the deck of the center frame; a swing out support frame having an upper end hingedly attached to the rear side of the center frame which is movable between an extended position and a stored position; the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 20° and less than 45°, determined relative to the side members of the center frame.

In an embodiment, a sofa dolly comprises a base defining a horizontal plane oriented parallel to a support surface, the base having a front side separated from a rear side by a depth and a right side separated from a left side by a width; a plurality of vertical supports extending vertically away from the base having a lower support end engaged with the base separated from an upper support end by a height; each of the supports further comprising a support arm having an inner arm end engaged with the upper support end and separated from an outer arm end by an arm length, the support arm positionable to extend away from the vertical support parallel to the horizontal plane of the base.

BRIEF DESCRIPTION OF THE DRAWINGS

Embodiments of the hand truck are described with reference to the following figures.

The same numbers are used throughout the figures to reference like features and components in which:

FIG. 4 is a rear side perspective view of the hand truck shown in FIG. 1 in the closed position according to an embodiment of this disclosure;

FIG. 5A is a top perspective view of a releasably engaged hinge between two frames in a released orientation, according to an embodiment of this disclosure;

FIG. 5B is a top perspective view of the releasably engaged hinge of FIG. 5A between two frames in an attached orientation according to an embodiment of this disclosure;

FIG. 6 is a side on view of the bottom end of a hand truck in the fully open position according to an embodiment of this disclosure;

FIG. 7 is an upward looking perspective view of the hand truck in the open position showing engagement of the engagement strip with the center frame according to an embodiment of this disclosure;

FIG. 8 is an upward looking perspective view of a hand truck in the open position showing engagement of the engagement strip with the center frame according to an embodiment of this disclosure;

FIG. 9A is a top perspective view of two hand trucks in the fully open position joined together top to bottom with a two-pin connector with one having the nose plate in the folded orientation according to an embodiment of this disclosure;

FIG. 9B is a top perspective view of a two-pin connector shown in FIG. 9A according to an embodiment of this disclosure;

FIG. 10 is top down view of a hand truck in the open position without a nose plate and with a non-movable handle according to alternative embodiments of this disclosure.

FIG. 11 is a top down perspective view of a hand truck in the open position showing engagement of the engagement strip with the center frame and having a non-movable handle according to an embodiment of this disclosure;

FIG. 12 is a perspective drawing shown walls of an enclosure about the perimeter of the dolly according to an embodiment of this disclosure;

FIG. 13 is a side on perspective view showing a pair of squared off U-shaped supports extending vertically from the deck of the dolly according to an embodiment of this disclosure;

FIG. 14 is a rear on view showing a pair of sofas being stored under and on the vertical U-shaped supports shown in FIG. 13, according to an embodiment of this disclosure;

FIG. 15 is a side perspective view of an embodiment of the hand truck in the closed position with the swing out support frame in the storage position;

FIG. 16 is a side perspective view of an embodiment of the hand truck in the open position with the swing out support frame in the storage position;

FIG. 17 is a side partial perspective view of an embodiment of the hand truck with the swing out support frame in the extended position;

FIG. 18 is a side partial perspective view of an embodiment of the hand truck with the swing out support frame in the closed or storage position;

FIG. 22 is a side perspective exploded view of an embodiment of the hand truck in the open position with the swing out support frame in the storage position showing the support attachment to the rear of the hand truck;

FIG. 23 is a side perspective view of an embodiment of the hand truck in the open position with the swing out support frame in the storage position showing the support attachment to the rear of the hand truck;

FIG. 24 is a top down perspective view of an embodiment of the hand truck in the open position showing the support engaged with the top deck of the hand truck;

FIG. 25 is a side view of an embodiment of the sofa dolly in the extended position;

DETAILED DESCRIPTION

Figure 1:
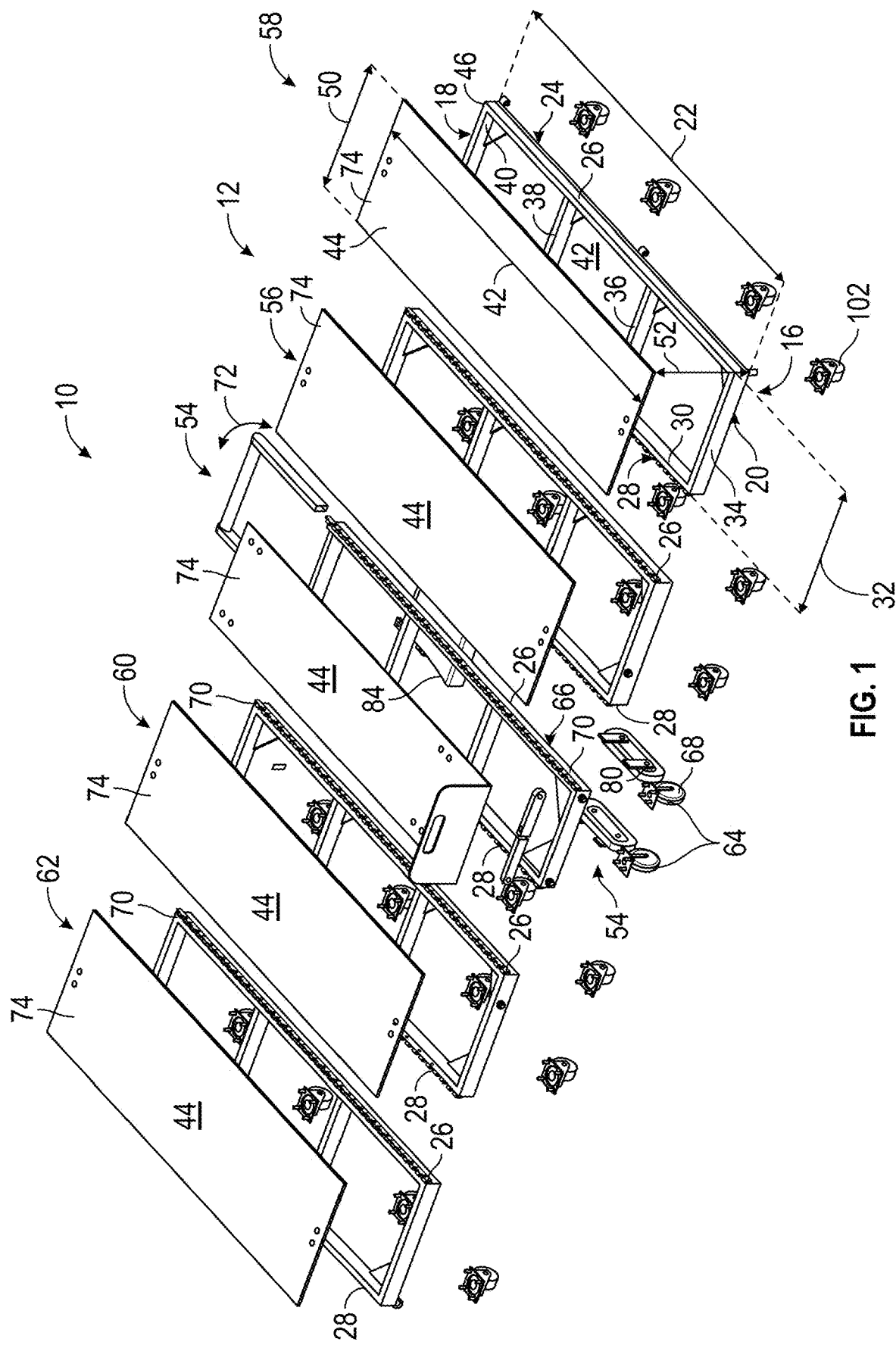
FIG. 1 is an exploded top down perspective view of a hand truck in the fully open position according to an embodiment of this disclosure.

At the outset, it should be noted that in the development of any such actual embodiment, numerous implementation-specific decisions must be made to achieve the developer's specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. In addition, the device or composition used/ disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The following definitions are provided in order to aid those skilled in the art in understanding the detailed description.

As used in the specification and claims, "near" is inclusive of "at." All numerical values within the detailed description and the claims herein are modified by "about" or "approximately" the indicated value, and take into account experimental error and variations that would be expected by a person having ordinary skill in the art. The term "and/or" refers to both the inclusive "and" case and the exclusive "or" case, whereas the term "and or" refers to the inclusive "and" case only, and such terms are used herein for brevity. For example, a composition comprising "A and/or B" may comprise A alone, B alone, or both A and B; and a composition comprising "A and or B" may comprise A alone, or both A and B.

The term "consisting essentially of" in reference to a composition is understood to mean that in addition to the indicated component, the device may further include additional components to the extent that the additional components do not substantially interfere with the essential function. The term "essentially" indicates the stated property, e.g., two surfaces which are essentially coplanar, indicates that the term does not rely on a strict mathematical interpretation of coplanar, but a general appearance of two surfaces which would be considered to form a flat surface as is commonly understood in the art.

In the following description, numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention. Likewise, certain terminology is used to describe certain features of one or more embodiments of the instant disclosure.

In one or more embodiments, a hand truck comprises a plurality of frames, each of the frames defining a top end separated from a bottom end by a height and a first side comprising a first member separated from a second side comprising a second side member by a width. In embodiments, the frames further comprise at least one cross member extending between the first side member and the second side member. The hand truck further includes a deck attached to a front side of one or more of the first side of the frame, the second side of the frame, and/or one or more cross members that makeup the frame. The deck is dimensioned e.g., height and width, and arranged to cover at least a portion of the width and the height defined by the frame.

Preferably most if not all of the area defined by the frame is covered by the deck, except for holes and other attachment points as will be described herein. One of this plurality of frames forms a center frame. The center frame comprises a wheel assembly attached to a rear side of the center frame, proximate to the bottom end and comprising at least one wheel adapted to facilitate a rolling movement of the hand truck over an external surface. Each of the remaining plurality of frames form side frames two of which may be attached to opposite sides of the center frame and the remaining frames, when present, attach to other side frames. In an embodiment, the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame. The hand truck further comprising a swing out support frame having an upper end hingedly attached to the rear side of the center frame which is movable between an extended position and a stored position. The support frame dimensioned and arranged such that when in the stored position, e.g., a folded up position when not in use, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, which in embodiments is from about 20° to 45° determined relative to the side members of the center frame. Accordingly, when in the extended position, the support frame allows the dolly to be tilted backward forming a triangular rolling structure to facilitate movement when in the closed position.

In embodiments, the support frame has a width less than or equal to an inner width between the two side members of the center frame. In embodiments, the support frame forms an angle of greater than about 20° and less than 45° when in the extended position. In some embodiments, the support frame is releasably engageable with the rear side of the center frame at a point between the upper end and the lower end of the support frame, which lockingly engages the support frame into the extended position. In some of such embodiments, the support frame comprises a locking arm hingedly attached to the support frame on a first end, and an open slot disposed through a second end dimensioned and arranged to engage a pin attached to the rear of the center frame.

In embodiments, the support frame further comprises one or more wheels adapted to facilitate a rolling movement of the hand truck over an external surface when in the extended position. In embodiments, the hand truck further comprises one or more handles, each extending away from and attached to the rear side of a corresponding side frame.

In embodiments, the hand truck further comprises two or more U-shaped supports comprising two vertical portions connected to a horizontal portion, each of the vertical portions having a first end releasably engaged with one or more frames, and/or the deck to extend away from the deck such that the horizontal portion is oriented essentially parallel to the deck between the two vertical portions; wherein the U-shaped support is dimensioned and arranged to removably engage the rear side of the frame such that the support is essentially coplanar with the side members when the first end of the support is not engaged with one or more frames, and/or the deck to extend away from the deck. In some of such embodiments, the U-shaped support has a width less than or equal to the width of the frame. In embodiments, the U-shaped support removably engages the rear side of the frame via one or more pins, clips, or a combination thereof.

In embodiments, a first side of the first side frame is hingedly attached to a second side of a second side frame movable between an open position and a closed position such that in the open position, the deck of the first side frame is essentially coplanar with a deck of the second side frame, and in the closed position, the deck of the first side frame is non-coplanar with the deck of the center frame. In embodiments, in the closed position, a front side of the deck of the first side frame directly faces and is oriented essentially parallel to a front side of the deck of the second side frame.

In embodiments, a second side of the third side frame is hingedly attached to a first side of a fourth side frame movable between an open position and a closed position such that in the open position, the deck of the third side frame is essentially coplanar with a deck of the fourth side frame, and in the closed position the deck of the third side frame is non-coplanar with the deck of the center frame. In embodiments, when in the closed position, a front side of the deck of the third side frame directly faces and is oriented essentially parallel to a front side of the deck of the fourth side frame.

In embodiments, when all of the plurality of side frames are in the open position, the decks of the side frames and the deck of the center frame are essentially coplanar, and when all of the plurality of side frames are in the closed position, the decks of each side frame is essentially perpendicular to the deck of the center frame.

In embodiments, each side frame comprises at least one rear support attached to and extending away from a rear side of the corresponding side frame.

In some embodiments, one or more of the side frames is removably hingedly attached to the center frame, to another side frame, or both. In embodiments, the hand truck further comprises one or more connector holes, clasps, or engagement points dimensioned and arranged to allow releasable engagement between at least one additional hand truck along a top end, a bottom end or a side when all of the side frames of each hand truck are in their open positions.

Figure 2:
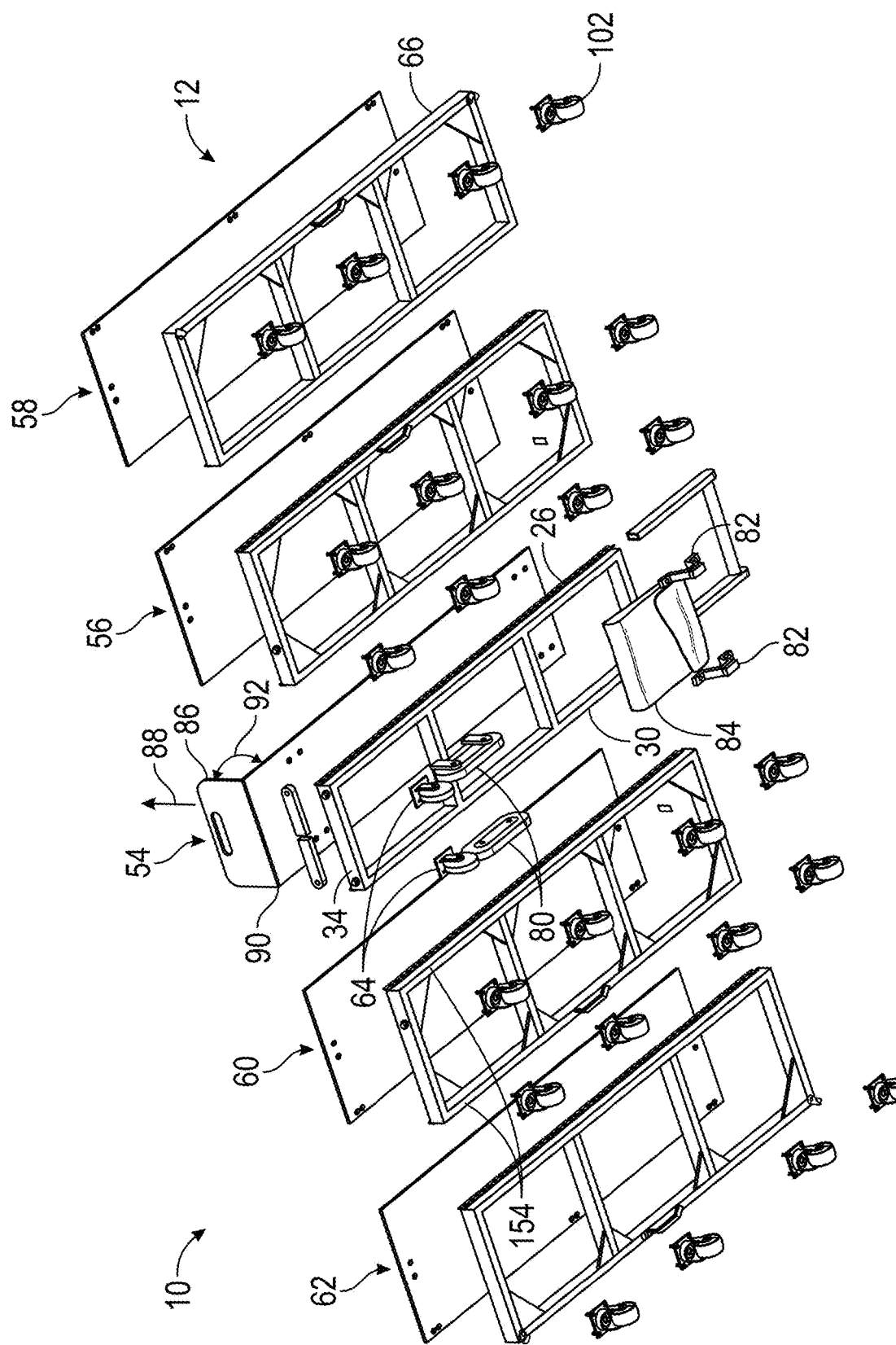
FIG. 2 is an exploded rear upward perspective view of a hand truck in the fully open position according to an embodiment of this disclosure.

Turning now to the figures in which FIG. 1 shows an exploded top down perspective view of a hand truck, generally referred to as 10, in the fully open position 12 according to an embodiment of this disclosure and FIG. 2 is an exploded rear upward perspective view of a hand truck 10 in the fully open position 12 according to one or more embodiments of this disclosure.

As shown in FIG. 1, in one or more embodiments, a hand truck 10 comprises a plurality of frames, generally referred to as 16. FIGS. 1 and 2 show five (5) of such frames, a center frame 54, a first side frame 56, a second side frame 58, a third side frame 60 and a fourth side frame 62, with only one of the frames being labeled in detail for clarity. However, it is to be understood that the number of frames may be any number greater than or equal to 2, and that the frames may be symmetrically arranged about the center frame as shown in FIGS. 1 and 2, or unsymmetrically arranged. Furthermore, the frames need not be of the same size and shape. The frames need only comprises a plurality of sides and may assume any shape, with a rectangular shape or a rectangular shape with rounded corners being preferred.

Each frame 16 defining a top end 18 separated from a bottom end 20 by a height 22. Each frame includes a first side 24 comprising a first side member 26 separated from a second side 28 comprising a second side member 30 by a width 32. The frames further comprise at least one cross member e.g., a bottom cross member 34, a lower middle cross member 36, an upper middle cross member 38, and a top cross member 40 are shown, extending between the first side member 26 and the second side member 30. The top end 18, the bottom end 20 and the two sides 24 and 28 define a frame area 42. The frames further include a deck 44 attached to a front side 46 of one or more of the first side 24, e.g., the first side member 26, the second side 28, e.g., the second side member 30 or the cross members 34, 36, 38, and/or 40. The deck 44 is dimensioned, i.e., having a deck height 48 and a deck width 50 and arranged to cover (indicated by arrow 52) at least a portion of the width 32 and the height 22 defined by the frame 16.

As shown in FIGS. 1 and 2, one of the plurality of frames forms center frame 54 and comprises a wheel assembly 64 attached to a 5 66 of the center frame 54, proximate to the bottom end 20 and comprising at least one wheel 68 adapted to facilitate a rolling movement of the hand truck 10 over an external surface. As is further shown in the figure, the wheel assembly 64 may be a wheel having an individual axle, but may also include a two wheel with a common axle as is common in the art. As is further shown, the rear side 66 of the center frame 54 may further include a stair crawler 80, one or more resting supports 82, a document or accessory container 84, and/or the like. As shown, each of the remaining plurality of frames 56, 58, 60 and 62 form the side frames, wherein the first side 26 of the center frame 54 is hingedly attached 70, e.g., via a hinge, to a second side 28 of a first side frame 56. The first side frame 56 is moveable 72 between an open position 12 and a 5 position 14 (see FIGS. 3 and 4) such that in the open position 12, the deck 44 of the center frame 54 is essentially coplanar with the deck 44 of the first side frame 56.

Figure 3:
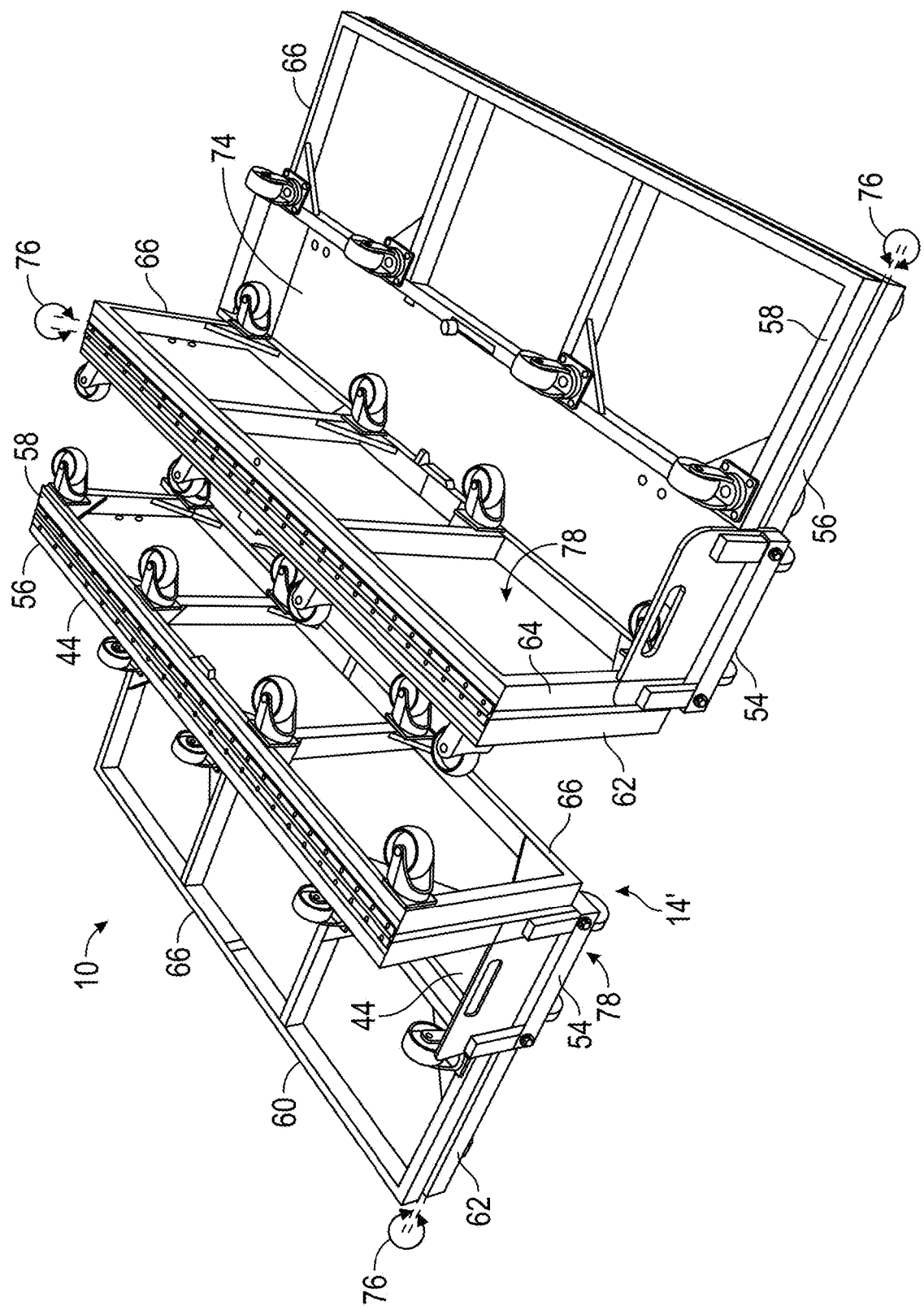
FIG. 3 is a top down perspective view of two hand trucks, each in a partially closed position according to an embodiment of this disclosure.
Figure 21:
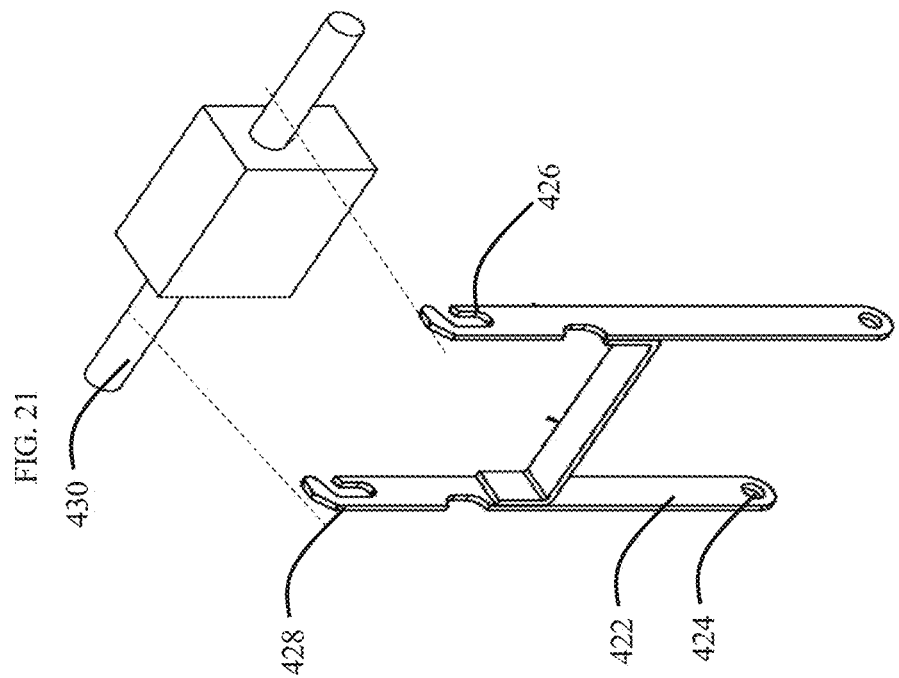
FIG. 21 is a side partial perspective view of a support frame locking mechanism according to embodiments of the disclosure.
Figure 20:
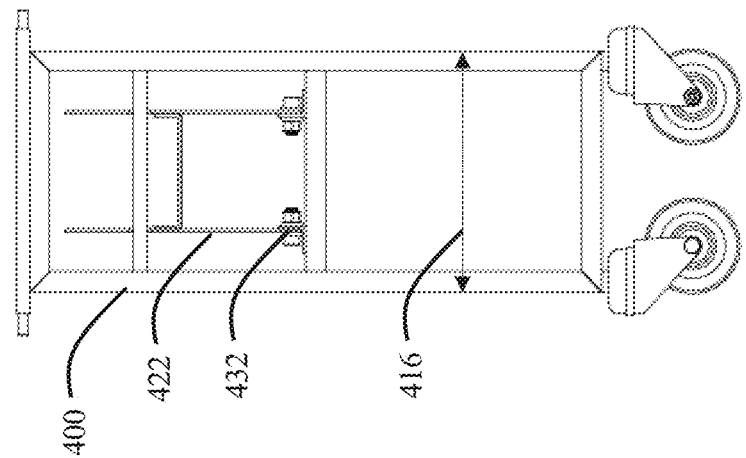
FIG. 20 is a front on view of a support frame according to embodiments of the disclosure.
Figure 19:
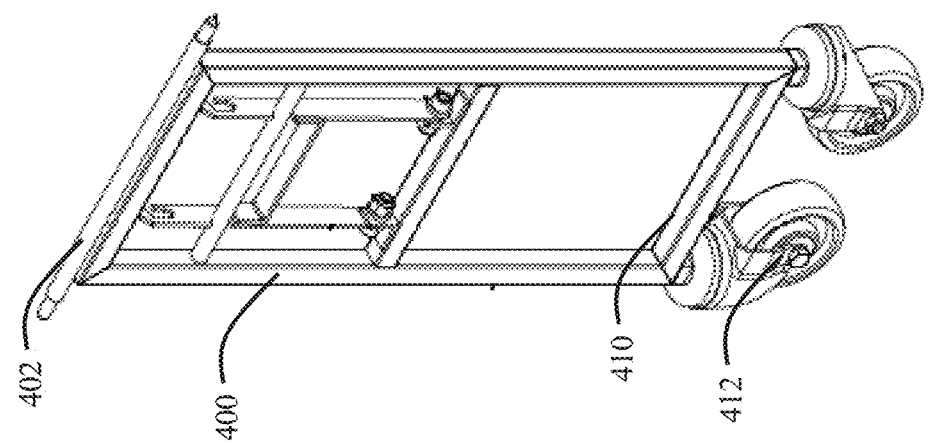
FIG. 19 is a side partial perspective view of a support frame according to embodiments of the disclosure.
Figure 26:
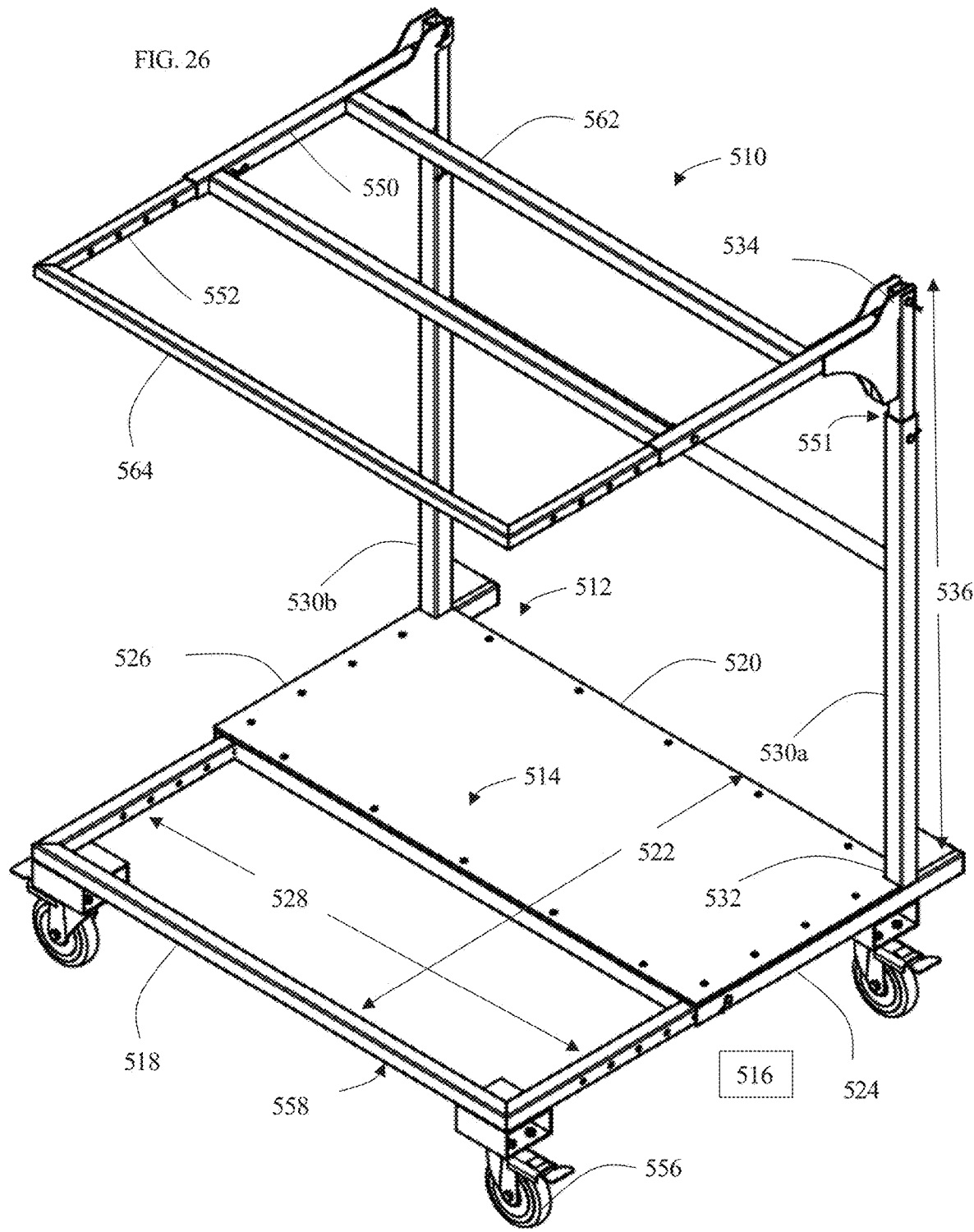
FIG. 26 is a top down perspective view of an embodiment of the sofa dolly in the extended position.

FIG. 3 is a top down perspective view of two hand trucks 10, each in a partially closed position 14' according to an embodiment of this disclosure. FIG. 4 shows a rear perspective view of the hand truck 10 in the fully closed position 14. As shown in the figures, in the closed position 14, the deck 44 of the center frame 54 is non-coplanar with the deck 44 of the first side frame 56. As partially shown in FIG. 3, and as shown in FIG. 4, in an embodiment, the deck 44 of the center frame 54 is essentially perpendicular to the deck of the first side frame 56 and the deck of the second side frame 58, the deck of the third side frame 60 and the deck of the fourth side frame 62 when the hand truck 10 is in the fully closed position 14.

As shown in FIGS. 1 through 4, in an embodiment, a first side 24 of the first side frame 56 is hingedly attached 70 to a second side 28 of a second side frame 58 movable 72 between an open position 12 and a closed position 14 such that in the open position 12, the deck 44 of the first side frame 56 is essentially coplanar with a deck 44 of the second side frame 58, and in the closed position 12, the deck 44 of the first side frame 56 is non-coplanar with the deck 44 of the second side frame 58. In the embodiment shown, when in the closed position 14 or partial closed position 14', a front side 74 of the deck 44 of the first side frame 56 directly faces and is oriented essentially parallel to 76 a front side 74 of the deck 44 of the second side frame 58.

In a similar way, in one or more embodiments, the hand truck 10 comprises a third side frame 60 in which the second side 28 of the center frame 54 is hingedly attached 70 to a first side 26 of the third side frame 60; moveable 72 between an open position 12 and a closed position 14 such that in the open position 12, the deck 44 of the center frame 54 is essentially coplanar with a deck 44 of the third side frame 60, and in the closed position 14 or 14', the deck 44 of the center frame 54 is non-coplanar with the deck 44 of the third side frame 60.

In embodiments, the second side 28 of the third side frame 60 is hingedly attached 70 to a first side 26 of the fourth side frame 62 movable 72 between an open position 12 and a closed position 14 or 14' such that in the open position 12, the deck 44 of the third side frame 60 is essentially coplanar with a deck 44 of the fourth side frame 62, and in the closed position 14 or 14', the deck 44 of the third side frame 60 is non-coplanar with the deck 44 of the fourth side frame 62.

Similar to above, in embodiments, wherein in the closed position 14 or 14', a front side 74 of the deck 44 of the third side frame 60 directly faces and is oriented essentially parallel to 76 a front side 74 of the deck 44 of the fourth side frame 62.

As shown in FIGS. 1 and 2, in embodiments of the hand truck 10, when all of the side frames 56, 58, 60, and 62 are in the fully open position 12, the decks 44 of the side frames 56, 58, 60, and 62 and the deck 44 of the center frame 54 are essentially coplanar, and in the fully closed position 14, the decks 44 of the side frames 56, 58, 60, and 62 are essentially perpendicular 78 to the deck 44 of the center frame 54.

In embodiments, the center frame 54 may further comprise a nose plate 86 attached to the deck 44, the frame e.g., frame members 26 and 30 and/or a cross member such as bottom cross member 34, or both. The nose plate 86 is disposed at or proximate to the bottom end 20 and has an extended orientation 88 extending away from the deck 44 of the center frame 54. In an embodiment, the nose plate 86 is hingedly attached 90 to the deck, one or more frame members, or both, movable 92 between the extended orientation 88 and a folded orientation 100 (see FIG. 9A) in which the nose plate 86 is oriented essentially parallel to the deck 44 of the center frame 54. As shown in FIG. 6, the center frame 54 further comprises one or more nose supports 94 movably attached 96 to the frame directly below the nose plate, and movable between a supporting orientation 98 extending essentially perpendicularly away from the deck 44 and the frame 54 such that the nose plate 86 is supported by nose supports 94 when in the supporting position 98 (see FIG. 6, and a retracted orientation 100 (FIG. 9A) in which the nose supports are oriented essentially parallel to the at least one cross member (e.g., bottom cross member 34).

As shown in FIG. 2, of the bottom end of a hand truck in the fully open position shows the nose plate of a hand truck in the extended position, in embodiments, each of the side frames e.g., 56 and 60, comprise at least one rear support 102 attached to and extending away from a rear side 66 of the corresponding side frame e.g., 56.

As shown in FIG. 8, in embodiments, the wheel assembly 64 extends a first distance 104 away from the rear side 66 of the center frame 56 and the rear support 102 extends away from the corresponding side frame, e.g., first side frame 56, by a second distance 106 which is greater than the first distance, such that when the hand truck 10 is oriented parallel to a supporting surface 108 and each of the side frames are in the open position 12, the wheel assembly 64 is not in contact with the supporting surface 108.

As shown in FIGS. 7 and 8, in embodiments, the side frame e.g., first side frame 56 or third side frame 60, which is directly attached to the center frame 54 comprises one or more engagement strips 154. Preferably the engagement strips 154 run along the outer edge of the side members 26 and 30. The engagement strips 154 are each attached to a rear side 66 of the first side member 26 and/or the second side member 30 of the respective side frame, and extend away from the respective side member. The engagement strips 154 are dimensioned and arranged to frictionally engage the rear side 66 of the frame to which that frame is attached, e.g., the center side frame 54 and/or the other side frame attached thereto, when the side frames are in the open position 12. Although the engagement strips may not engage the side member of the adjacent frame at all times, they provide a frictional engagement which holds the frames in the open position.

As is also shown in FIG. 7, in embodiments, the handle assembly may be slidably engaged with the frame or in some embodiments, the handle assembly may be fixed to the center frame in a stationary position. As is also shown in FIG. 10, in embodiments, the hand truck does not include a nose plate, and/or the nose plate is removable from the hand truck.

As shown in FIG. 6, in some embodiments the side frame(s) directly attached to the center frame 54, e.g., first side frame 56 and third side frame 60, comprise a plurality of rear supports 102 where at least one of the rear supports 102 is attached to the rear of the side frame proximate to the first side (102') and at least of the rear supports is attached to the rear of the side frame proximate to the second side (102"). In some embodiments, each terminal side frame, i.e., a side frame only attached to one other side frame e.g., second side frame 58 and fourth side frame 62, comprises at least one rear support 102, preferably attached proximate to the unattached side 110, i.e., the side opposite the side attached to the other side frame.

In embodiments, the rear supports comprise pegs, pedestals, skids, castors as shown, rollers, or a combination thereof. As shown in FIG. 2, the supports are swiveling castors and are located along the frame side members 26 and 30.

In embodiments, the center frame 54 further comprises a handle assembly 116, disposed at the top end 18. FIG. 10 shows a top perspective view of the top end 18 of a center frame 54 showing the handle assembly 116 in the non-extended position 118. FIG. 4 shows the handle assembly 116 in an extended position 120. In some embodiments, the handle assembly 116 is movably engaged with the first side member 26 and the second side member 30, e.g., via a telescoping arrangement, such that the handle assembly 116 has a non-extended position 118 in which the handle assembly 116 is located at, near or below the top end 18 of the frame, and an extended position 120 in which the handle assembly 116 extends away from the top end 18, preferably in a direction parallel to the deck 44.

The utility of a hand truck is determined by the load carrying ability and the overall dimensions, which must allow the hand truck to fit through doors, hallways, up ramps, and the like. In embodiments, the hand truck 10 has a total height 22 (See FIG. 10) of greater than or equal to about 36 inches, preferably from about 36 inches to about 60 inches or more. In embodiments, the total width in the closed position 117 (See FIG. 4, which includes the castors or other supports) is sufficient to allow the dolly in the fully closed position to fit through a standard doorway, e.g., is less than or equal to about 30 inches or less than or equal to about 24 inches including the supports 102 when all of the side frames are in their respective closed positions. This allows the hand truck of the instant disclosure to fit within any standard doorway. As shown in FIG. 10, in an embodiment, the total width of the hand truck in the fully open position 12 is greater than or equal to about 60 inches, preferably greater than or equal to about 72 inches, with greater than or equal to about 120 inches being preferred. Accordingly, in the totally open position 12, the hand truck forms a movable platform which is preferably about 5 ft by 10 ft, which can be rolled into a typical room through a standard 24" doorway when in the totally closed position 14.

The hand truck is preferably fabricated out of extruded aluminum frames with 2-6 mm (⅛"-¼") or thicker aluminum decking attached thereto. The side members 28 and 30 are preferably welded to the one or more cross members and the intersection of the cross members with the side members is reinforced 114, which may further provide a structure for mounting of the rear supports 102. In embodiments, the hand truck 10 in the fully open position 12 is capable of supporting greater than or equal to about 500 lbs, preferably greater than or equal to about 750 lbs, preferably greater than or equal to about 1000 lbs, with greater than or equal to about 1500 lbs being more preferred. As shown in FIG. 4, the hinged attachment of the side frames to the center frame and/or to each other may, in some embodiments, be made by means of a continuous or piano hinge, and/or other substantial hinges suitable for the intended purpose.

As shown in FIGS. 5A and 5B, in embodiments, one or more of the side frames, e.g., 56, is removably hingedly attached 122 to the center frame 54, and/or to another side frame, or both. FIG. 5A is a top perspective view of a releasably engaged hinge between two frames in a released orientation and FIG. 5B is the same view of the two frames engaged via hinge 122, i.e., in an attached orientation according to an embodiment of this disclosure.

FIG. 10 is a top down perspective view of a hand truck 10 in the fully open position 12 according to an embodiment of this disclosure. As is shown in the figure, in embodiments the frames further comprise one or more connector holes 124 disposed through one or more decks 44 dimensioned and arranged to allow releasable engagement between at least one additional hand truck along a top end 18, a bottom end 20 or a side 24 or 26 when all of the side members e.g., 56, 58, 60 and 62 are in their open positions relative to each other and to center frame 54. As shown in FIG. 9A, which is a top perspective view of the two hand trucks 10 and 10' in the fully open position 12 joined together top end 18 to bottom end 20. As shown in the figure, the attachment may be made by means of a rope and/or with a purpose built two-pin connector 128 as shown in FIG. 9B. In embodiments, the attachment points comprise holes, loops, rings, swivels, cleats, or a combination thereof, suitable for attachment of a rope, strap, or cable thereto.

As is further shown in FIG. 9A, the nose plate of one of the hand trucks is in the folded orientation 100 according to an embodiment of this disclosure. As shown in FIG. 9B, the two pin connector 128 comprises two pins 130 and 132 oriented perpendicular to and extending away from a back member 134, dimensioned to allow engagement of the first pin 130 within a connector hole 124 of the hand truck 10' and engagement of the second pin 132 within a connector hole 124 of the other hand truck 10. In some embodiments, the connector 128 may include a locking pin 136 which engages the pin 130 with the side member 26 or 30.

In some embodiments, the dolly further comprises one or more attachment points engaged on or with the deck and/or the frame members of one or more frames, to which a handle may be removably attachable thereto allowing for movement of the hand truck while in an open position and disposed on a supporting surface.

As shown in FIG. 16, in one or more embodiments, at least one side frame comprises a stage handle attachment comprising a hole disposed through a deck at least partially into a frame member or a cross member, dimensioned to receive a removable stage handle therein, such that the stage handle is oriented essentially perpendicular away from the deck. In an alternative embodiment, one or both of the frames having a frame sides not engaged with another frame comprises a movable stage handle rotationally engaged with the non-engaged frame side, having an up position oriented essentially perpendicular to the deck and a down position oriented essentially parallel to or below the deck.

Turning now to FIG. 12, in embodiments the hand truck may further include a collapsible enclosure 200, which covers at least a portion of the deck when the frames are in the open position. In embodiments, the enclosure comprises a plurality of walls 202, 206, 208 and 210, along a perimeter 212 of the open deck, i.e., two of the sides and each of the upper ends and each of the lower ends of the plurality of frames form a deck perimeter when in the open position. The enclosure is preferably suitable to protect the contents therein from dust and other contaminants, and/or provides a water resistant covering to protect the contents disposed therein. In embodiments, the plurality of walls are releasably engaged with one or more of the frames, the deck, or both, extending vertically away from the deck when in the open position about at least a portion of the deck perimeter. In some embodiments, the enclosure comprises at least four walls disposed about the entire perimeter of the open deck along with one or more top panels engaged with at least two of the walls oriented parallel to the deck forming an enclosure about the perimeter of the deck. In some embodiments the enclosure includes a top or a roof 204 and may include an openable door which may be closed to protect the contents therein.

In embodiments, the plurality of walls are releasably engaged with one or more frame sides, one or more frame ends, or a combination thereof, via one or more push-pins which engage a corresponding hole disposed through the deck. As is also shown, in embodiments the plurality of walls are releasably engaged with one another via one or more latches, one or more hook and loop fasteners, zippers, one or more hinges, or more threaded fasteners, or a combination thereof.

In embodiments, two or more of the plurality of walls are hingedly attached to one another 214 along a side oriented essentially perpendicular to the deck. In some embodiments, the hinge is simply a bend in the material, e.g., a fold line in a cardboard panel. In other embodiments, the hinge is a strap, or an actual hinge, depending on the material from which the walls are made.

In embodiments, walls are formed from wooden panels, cardboard, rigid corrugated plastic sheeting, foamboard, sheet metal, or a combination thereof. In other embodiments the walls are formed from a non-rigid material such as a woven or non-woven cloth, plastic film or tarp, and/or the like engaged with or disposed over an underlying inner support system, e.g., poles forming a skeletal structure with a tarp, plastic film, and/or cloth disposed thereover, optionally the covering material is engaged with a portion of the dolly, e.g., via hook & loop, grommets, cording, and/or the like. In embodiments, the top panels, when present are formed from wooden panels, cardboard, rigid corrugated plastic sheeting, sheet metal, flexible plastic film, woven fabric, non-woven fabric, or a combination thereof.

In embodiments, at least a portion of at least one of the walls is hingedly attached to an adjacent portion of the same wall or an adjacent wall to form a door to the enclosure. Likewise, portions of the walls may overlap with one-another and may further include connecting holes or other fasteners to allow portions of the enclosure to be connected to one another and/or the dolly.

In embodiments, the walls are provided in an accordion manner, e.g., folding like the bellows of an accordion such that they comprise a plurality of panels, two of which are hingedly attached and/or releasably attached to an adjacent panel along a single edge and the remaining panels are hingedly attached and/or releasably attached to adjacent panels on two edges, such that when in a collapsed position the walls form a rectangular solid and when in an expended position the panels form the walls about at least a portion of the deck perimeter 212.

In embodiments, the walls are provided as pre-cut and creased carboard or other light weight material, having a folded arrangement dimensioned and arrangeable to be transported on the dolly when the dolly is in the closed position, which opens up to form the enclosure in an extended arrangement, which forms the enclosure over the deck when the dolly is in the open position. In embodiments, the enclosure is a single or limited use item, e.g., carboard and/or plastic tarps. In other embodiments, the enclosure is constructed for multiple uses, e.g., wooden or metal panels, canvas or tarps covering a system of support poles similar to a tent, and/or the like.

In embodiments, the walls extend vertically upward to a height of at least 1 meter, preferably 2 meters and less than 3 meters, when determined from the deck. In embodiments, the walls are formed from a plurality of interlocking or attachable panels, each having a width greater than or equal to about 1 ft (0.3 m), preferably 2 ft (0.6 m), preferably 3 ft (1.2 m).

In embodiments, the dolly further comprises one or more additional support structures engaged with the frames, the deck, or a combination thereof which provide for more efficient use and/or stowage of particular items commonly found in dwellings and office buildings. In embodiments, the dolly further includes one or more additional supports extending vertically upward from one or more portions of the deck. In embodiments, the additional supports have a vertical height above the deck, and as spaced apart horizontally about the deck in amounts sufficient to allow various items e.g., furniture, to be stored between the two supports, e.g., chairs, a love seat, a dresser, and/or the like, while further providing a support to allow a larger piece of furniture and/or a shelf or other suitably sized support to be engaged with a top horizontal portion of the supports allowing for additional items to be stacked above the items located at least partially between the two supports.

As shown in FIG. 13, in embodiments, the supports comprise two or more rectangular or squared off U-shaped supports which engage the dolly via holes or other attachments disposed in or placed on the deck. The supports are spaced apart 318 from one another to allow items to be placed therebetween, while a horizontal portion 320 of each of the supports provides a support for a larger or longer item to be placed thereon. For example, in the embodiment shown in FIG. 14, the two squared off U-shaped supports 310 and 312 extend above the deck, and are spaced apart on the deck, in an amount sufficient to allow a love seat 316 to be placed between the two supports. A sofa may then be placed on the horizontal portions of the supports above the loveseat. Likewise, instead of a sofa, a shelf board could be placed across the supports to allow additional items to be stacked thereon for storage. As shown in FIG. 14, the two squared off U-shaped supports 310 and 312 (also referred to herein simply as the "U-shaped supports") may be dimensioned to allow at least a portion of a sofa or other item to protrude through the opening between the two vertical portions 322 of the support allowing for two sofas to be stacked one on top of the other. Also shown is a cloths rack or hanging rack 324 engaged with the deck.

Other embodiments include a pair of vertical supports horizontally spaced apart from one another on the deck and connected by a closet rod and/or the like, dimensioned and arranged to allow hanging clothes to be stored on the dolly. Other embodiments include vertical supports comprising bins, baskets, and/or the like, which allow for storage of smaller items without having to be boxed prior to storage on the dolly.

FIG. 15 shows an embodiment of the hand truck 10 in the closed position 14 further comprising a swing out support frame 400 having an upper end 402 hingedly attached 404 to the rear side 66 of the center frame 54 which is movable between an extended position 406 shown in FIG. 17, and a stored position 408 shown in FIG. 18. As shown in the figures, the support frame 400 is dimensioned and arranged such that when in the stored position 408, a lower end 410 of the support frame is near and/or in contact with a cross member e.g. 36, of the center frame 54 and does not extend below the bottom of the center frame 54. In other words, the swing out support frame folds inward so as not to protrude away from the rear of the hand truck by a significant amount. As shown in FIG. 17, when the swing out support frame is in the extended position 406, the lower end 410 of the support frame 400 extends a distance away from the side members 66 such that the support frame forms an angle 414, indicated by the dotted lines, of greater than about 10° and less than 90°, determined relative to the side members of the center frame, which is preferably from about 20° to about 45°.

As shown in FIGS. 15-20. the support frame 400 may have a width 416 which is less than or equal to an inner width 418 between the two side members 26 and 30 of the center frame 54.

As shown in the figures, the support frame 400 is releasably engageable 420 with the rear side 66 of the center frame 57 at a point between the upper end and the lower end of the support frame, which lockingly engages the support frame 400 into the extended position 406.

In embodiments, the support frame 400 comprises a locking arm 422 hingedly attached 432 to the support frame on a first end 424, and an open slot 426 disposed through a second end 428 dimensioned and arranged to engage a pin 430 attached to the rear 66 of the center frame 57.

In embodiments, the support frame 400 further comprises one or more wheels 412, e.g., casters, adapted to facilitate a rolling movement of the hand truck over an external surface when in the extended position 406.

As shown in FIGS. 15 and 16, in embodiments, the hand truck further comprises one or more handles 432, each extending away from and attached to the rear side 66 of a corresponding side frame e.g., 57.

As shown in FIGS. 22-24, in embodiments, the hand truck further comprises supports that engage with the deck and/or the side members of a frame to extend away from the deck when in the open position. In embodiments, a U-shaped support 312 comprises two vertical portions connected to a horizontal portion, each of the vertical portions having a first end releasably engaged with one or more frames, and/or the deck to extend away from the deck such that the horizontal portion is oriented essentially parallel to the deck between the two vertical portions (see FIG. 24). As shown in FIGS. 22 and 23, in embodiments, the U-shaped support is dimensioned and arranged to removably engage the rear side of the frame, e.g., via pins, clips 440, and/or the like, such that the support is essentially coplanar with the side members when the first end of the support is not engaged with one or more frames and/or the deck to extend away from the deck, i.e., when in a storage position or not being used.

Sofa Dolly

As shown in FIGS. 25-28, in a related embodiments, a sofa dolly 510 comprises a base 512 defining a horizontal plane 514 oriented parallel to a support surface 516, e.g., a floor. The base 512 having a front side 518 separated from a rear side 520 by a depth 22, and a right side 24 separated from a left side 26 by a width 28. In embodiments, the depth 522 is sufficient to support at least a portion of a sofa or other piece of furniture oriented with the long side of the piece of furniture perpendicular to the rear side 20 of the dolly (not shown). In such embodiments, the depth is greater than or equal to about 20 cm, preferably from about 20 cm to about 50 cm. In other embodiments, the depth of the base 522 is sufficient to support a sofa or other piece of furniture oriented with the long side of the piece of furniture parallel to the rear side 520 of the dolly. In such embodiments, the depth is greater than or equal to about 50 cm, preferably from about 50 cm to about 150 cm. In embodiments, the width 528 is sufficient to support at least a portion of a sofa or other piece of furniture oriented with the long side of the piece of furniture perpendicular to the rear side 20 of the dolly. In such embodiments, the width 528 is greater than or equal to about 70 cm, preferably from about 70 cm to about 150 cm. In other embodiments, the width of the base 528 is sufficient to support a sofa or other piece of furniture oriented with the long side of the piece of furniture parallel to the rear side 520 of the dolly. In such embodiments, the width 528 is greater than or equal to about 70 cm, preferably from about 70 cm to about 200 cm.

In embodiments, the base 512 comprises a plurality of rollers, feet, or other such support structures 556 engaged with a lower face 558 of the base 512 and arranged between the support surface 16 and the lower face 558. This allows the dolly 510 to be movable once loaded with one or more sofas or other piece(s) of furniture.

The dolly 510 further includes a plurality of vertical supports 530 extending vertically away from the base 512 having a lower support end 532 engaged with the base 512 separated from an upper support end 534 by a height 536. In embodiments, the height is grater then the typical height of a sofa or chair. In some embodiments, the height 536 is from 100 cm to about 150 cm. In some embodiments the height 536 is adjustable by a telescoping arrangement 551 wherein each of the vertical supports 530 comprises an inner assembly 538 bound by an outer assembly 540 forming a releasably engageable, e.g., via pin 542, telescoping assembly 551 proximate to the upper end 534 such that the height 536 of each of the plurality of vertical supports 530 may be varied.

In embodiments, each of the supports 530 further comprises a support arm 544 having an inner arm end 550 engaged 546 with the upper support end 534 and separated from an outer arm end 552 by an arm length 554. The support arm 544 is positionable 548 to extend away from the vertical support 530 in a parallel orientation to the horizontal plane 514 of the base 512.

In embodiments, the arm length 554 is sufficient to support at least a portion of a sofa or other piece of furniture oriented with the long side of the piece of furniture perpendicular to the rear side 520 of the dolly. In such embodiments, the arm length 554 is greater than or equal to about 20 cm, preferably from about 20 cm to about 50 cm. In other embodiments, the arm length 554 is sufficient to support a sofa or other piece of furniture 600 (see FIGS. 29 and 30) oriented with the long side of the piece of furniture parallel to the rear side 520 of the dolly. In such embodiments, the arm length 554 is greater than or equal to about 50 cm, preferably from about 50 cm to about 150 cm.

In embodiments, each of the support arms 544 are rotationally engaged with 548 and rotatable about the upper support end 534 of the vertical support 530. In one or more embodiments, the lower end 532 of a first vertical support 530*a* is engaged with the base 512 proximate to the right side 524 of the base 512, and the lower end 532 of a second vertical support 530*b* is engaged with the base 512 proximate to the left side 526 of the base, or a combination thereof.

Figure 29:
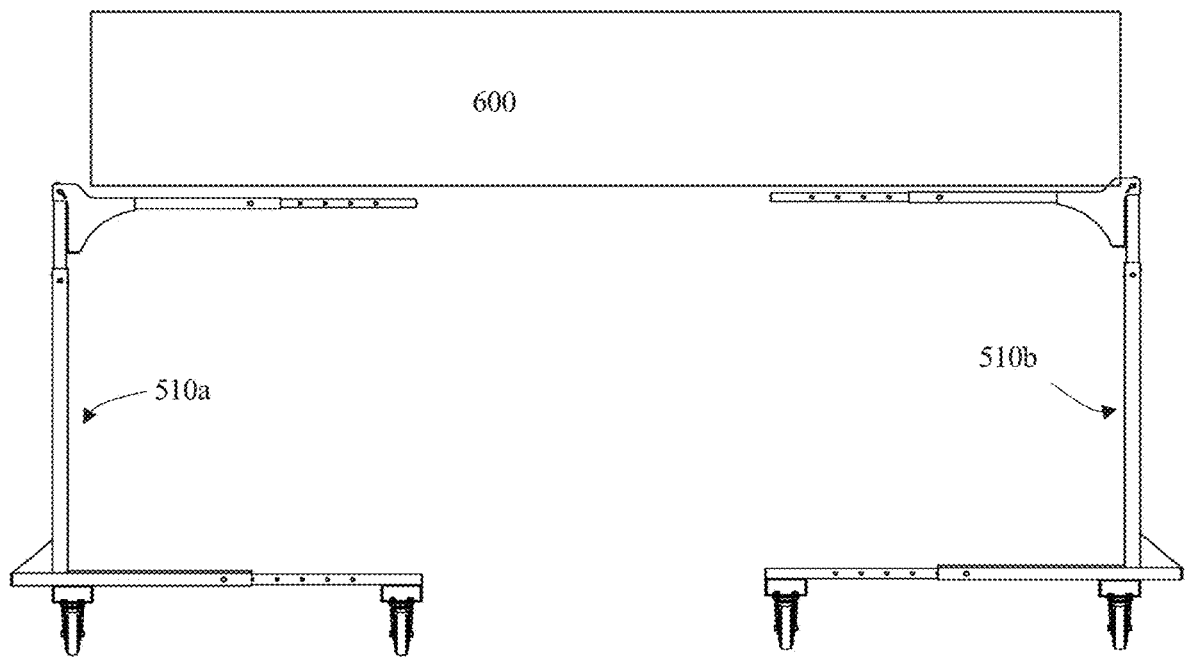
FIG. 29 is a side view of an embodiment showing two dollies in the extended position.
Figure 30:
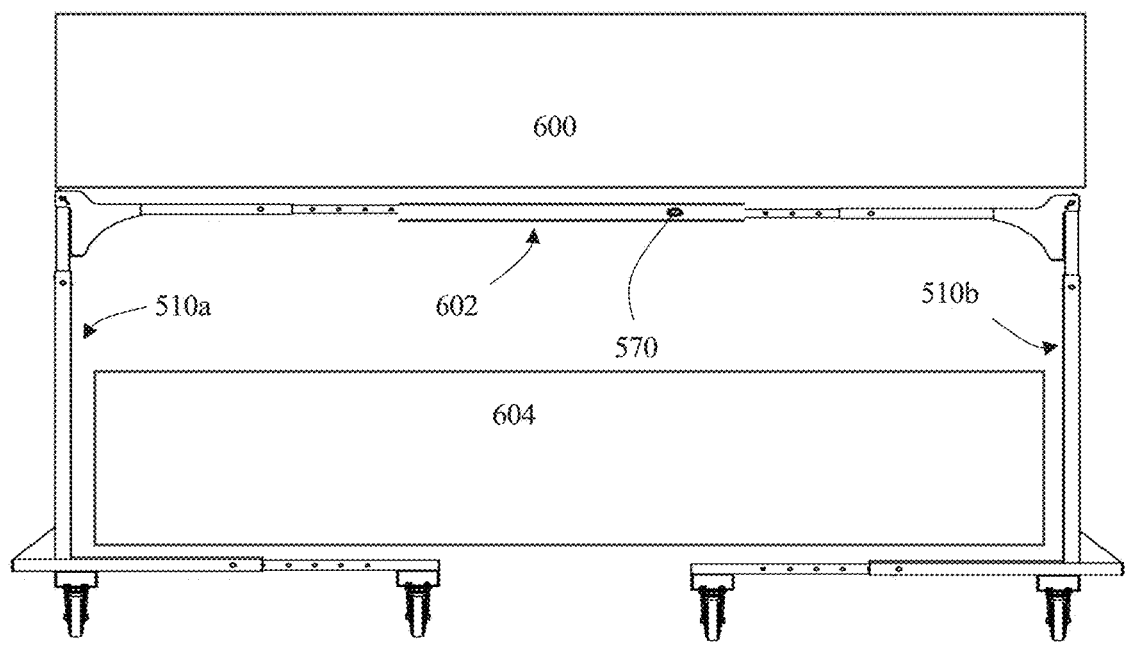
FIG. 30 is a side view of an embodiment showing two dollies in the extended position connected to one another via a lateral connector.

As shown FIGS. 29 and 30, in embodiments, two dollies may be used to support a sofa 600, which in an embodiment may also be joined together by a lateral support 602 and extension. As shown in FIG. 30. in embodiments, a second sofa or similar piece of furniture 604 or pieces of furniture may be supported by the base allowing for stacking of the two pieces of furniture.

Figure 31:
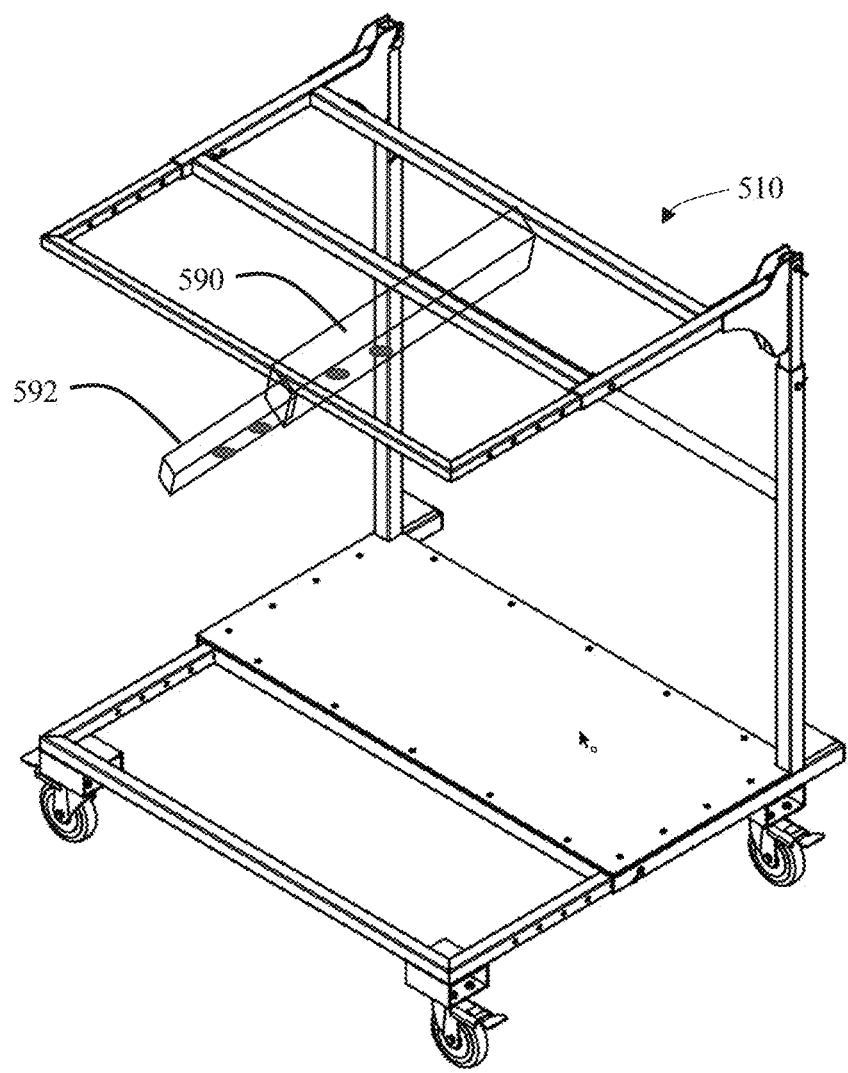
FIG. 31 is a top down perspective view of an embodiment showing a sofa dolly comprising a lateral connector.

The support arms may be locked in place with a pin to engage the support arms further comprising a lateral support 590 (see FIG. 31) and a lateral extension 592. In embodiments, each of the vertical supports 530 are connected to each other with at least one horizontal stabilizer 560 (see FIG. 28), preferably arranged proximate to the upper support end, which in embodiments is arranged parallel with the base, preferably the rear side of the base. In some embodiments, each of the inner support arm ends 550 are connected to each other with a rear horizontal stabilizer 562, which is preferably arranged parallel to the base 512, and/or the outer arm ends 552 of the support arms 544 are connected to each other with a front horizontal stabilizer 564, which is preferably arranged parallel to the rear horizontal stabilizer 562.

Figure 28:
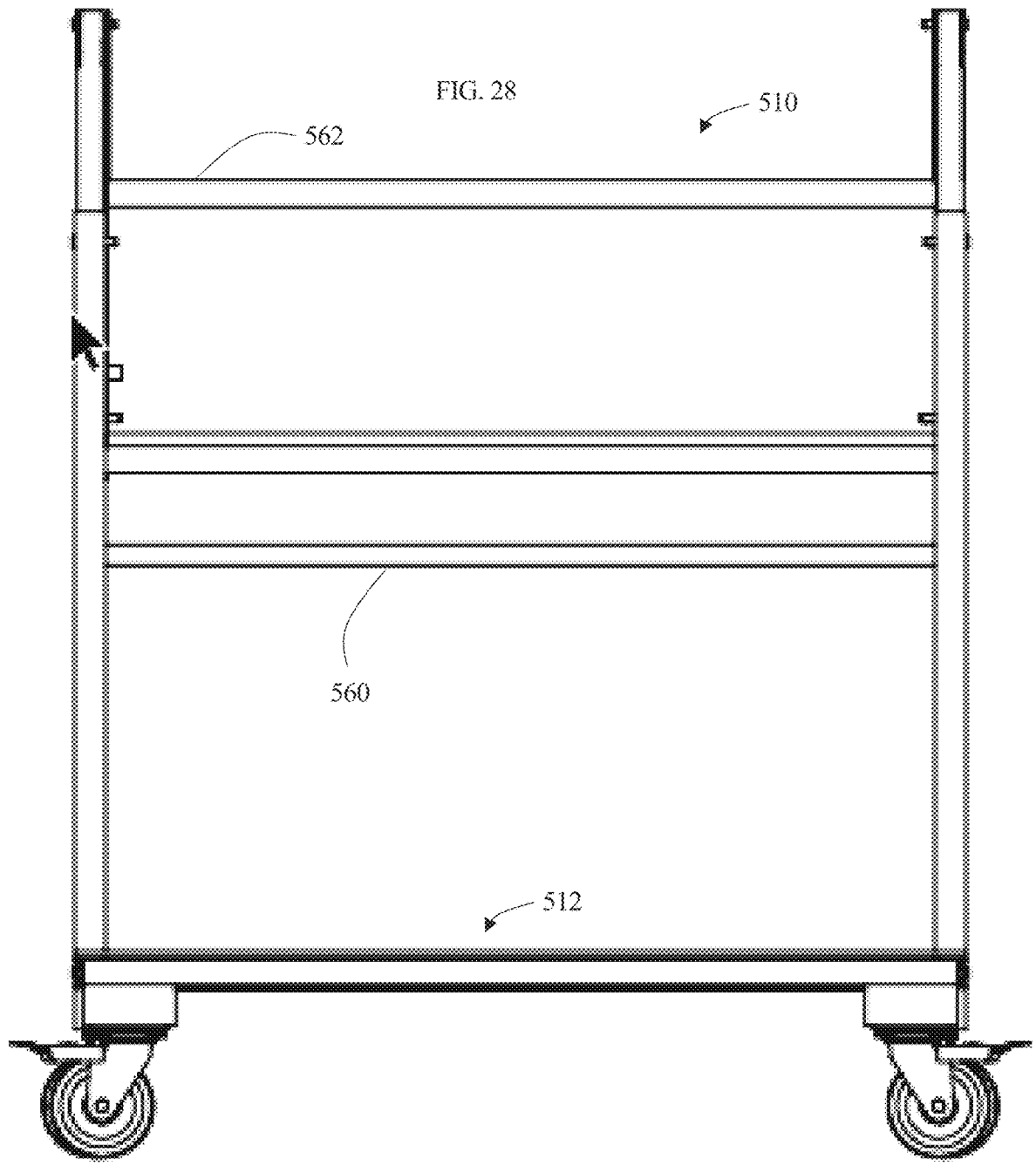
FIG. 28 is a rear facing view of an embodiment of the sofa dolly in the extended position.

As shown in FIG. 29, in some of such embodiments, the sofa dolly 510 further comprises a lateral connector 602 oriented essentially perpendicular to the horizontal stabilizer(s) 562 and 564 and parallel to and in between at least two of the vertical support arms 544 connecting the lateral supports 590 or 592. In embodiments the lateral connector 602 is engaged with the rear horizontal stabilizer 562 and the front horizontal stabilizer 564, and extends away from the rear horizontal stabilizer 562. FIGS. 29 and 30 show the support arms locked into a parallel arrangement with the base and further shows the lateral support. In such embodiments, the lateral connector 602 may be dimensioned and arranged to receive, and releasably engage e.g., via pin 570, and/or a lateral connector extension dimensioned and arranged to join two such sofa dollies together via engagement of this lateral connector extension 602 with another lateral connector of a second sofa dolly FIG. 28 shows a rear facing view of the dolly with the support arms locked into the parallel arrangement. As is also shown in FIG. 28, in embodiments the supports are arranged inward of the rear most edge of the base to add stability. In embodiments, the lateral connector may be releasably joined to engage two dollies.

In embodiments, the lateral connector is hollow and the lateral connector extension fits within the inner portion of the lateral connector in a telescoping arrangement. In embodiments the lateral connector and the lateral extension are releasably engaged with one another via pin in hole/slot or other such engagement mechanism such that when two dollies are joined together, the distance between the two dollies is adjustable.

Figure 27:
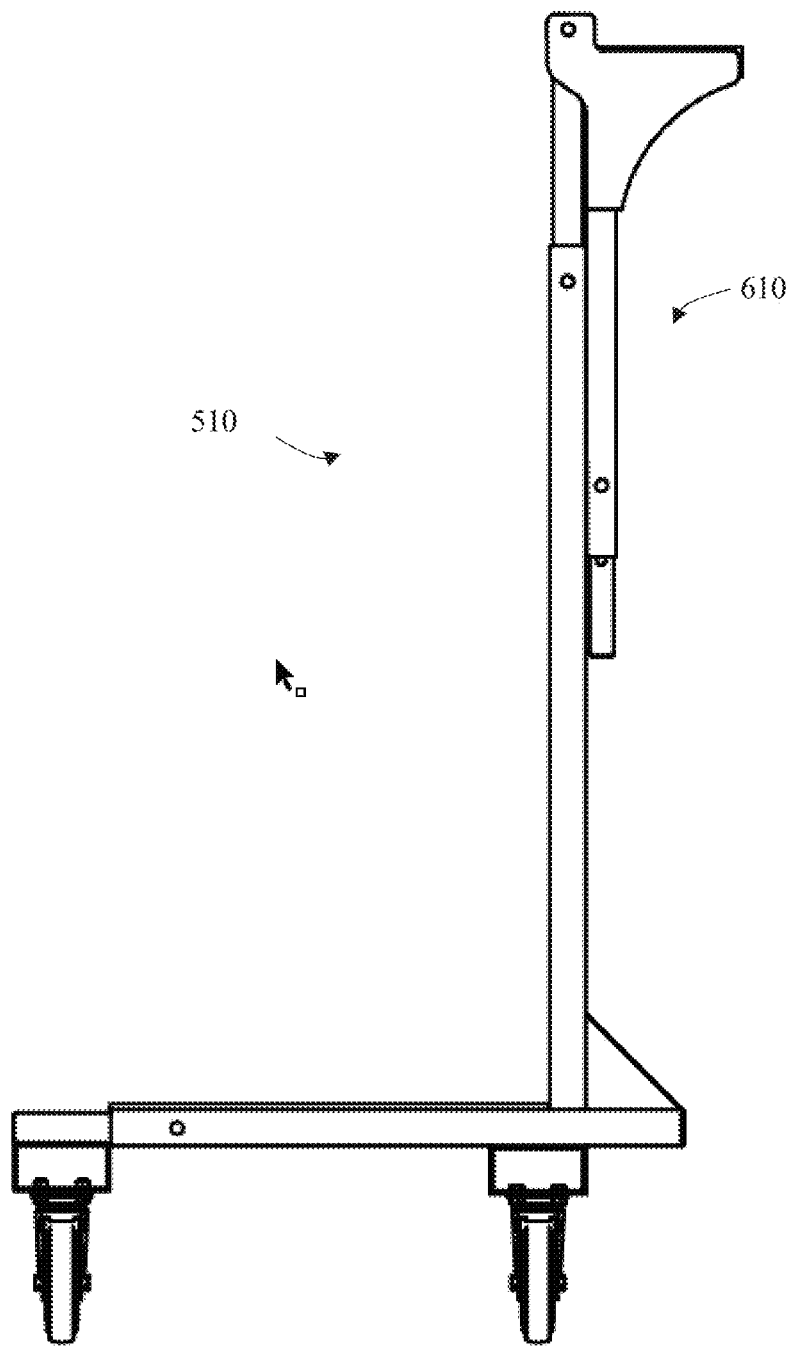
FIG. 27 is a side view of an embodiment of the sofa dolly in the non-extended or storage position.

FIG. 27 shows the sofa dolly with the arms in a downward position 610, e.g., which may be utilized for loading of the dolly and/or storage of the dolly.

EMBODIMENTS

The instant disclosure thus includes embodiments according to the following.
E1. A hand truck comprising:
a plurality of frames, each defining a top end separated from a bottom end by a height;
a first side comprising a first side member separated from a second side comprising a second side member by a width, and further comprising at least one cross member extending between the first side member and the second side member;
a deck attached to a front side of one or more of the first side, the second side or the at least one cross member, dimensioned and arranged to cover at least a portion of the width and the height defined by the frame;
wherein one of the plurality of frames forms a center frame and comprises a wheel assembly attached to a rear side of the center frame, proximate to the bottom end and comprising at least one wheel adapted to facilitate a rolling movement of the hand truck over an external surface;
each of the remaining plurality of frames forming side frames, wherein the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame;
wherein the second side of the center frame is hingedly attached to a first side of a third side frame; moveable between an open position and a closed position such that in the open position, the deck of the center frame is essentially coplanar with a deck of the third side frame, and in the closed position the deck of the center frame is non-coplanar with the deck of the third side frame;
a swing out support frame having an upper end hingedly attached to the rear side of the center frame which is movable between an extended position and a stored position;
the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.
E2. The hand truck according to embodiment E1, wherein the support frame has a width less than or equal to an inner width between the two side members of the center frame.
E3. The hand truck according to embodiment E1 or E2, wherein the support frame forms an angle of greater than about 20° and less than 45° when in the extended position.

E4. The hand truck according to any one of embodiments E1-E3, wherein the support frame is releasably engageable with the rear side of the center frame at a point between the upper end and the lower end of the support frame, which lockingly engages the support frame into the extended position.

E5. The hand truck according to any one of embodiments E1-E4, wherein the support frame comprises a locking arm hingedly attached to the support frame on a first end, and an open slot disposed through a second end dimensioned and arranged to engage a pin attached to the rear of the center frame.

E6. The hand truck according to any one of embodiments E1-E5, wherein the support frame further comprises one or more wheels adapted to facilitate a rolling movement of the hand truck over an external surface when in the extended position.

E7. The hand truck according to any one of embodiments E1-E6, further comprising one or more handles each extending away from and attached to the rear side of a corresponding side frame.

E8. The hand truck according to any one of embodiments E1-E7, further comprising two or more U-shaped supports comprising two vertical portions connected to a horizontal portion, each of the vertical portions having a first end releasably engaged with one or more frames, and/or the deck to extend away from the deck such that the horizontal portion is oriented essentially parallel to the deck between the two vertical portions;
wherein the U-shaped support is dimensioned and arranged to removably engage the rear side of the frame such that the support is essentially coplanar with the side members when the first end of the support is not engaged with one or more frames, and/or the deck to extend away from the deck.

E9. The hand truck according to any one of embodiments E1-E8, wherein the U-shaped support, and has a width less than or equal to the width of the frame.

E10. The hand truck according to any one of embodiments E1-E9, wherein the U-shaped support removably engages the rear side of the frame via one or more pins, clips, or a combination thereof.

E11. The hand truck according to any one of embodiments E1-E10, wherein a first side of the first side frame is hingedly attached to a second side of a second side frame movable between an open position and a closed position such that in the open position, the deck of the first side frame is essentially coplanar with a deck of the second side frame, and in the closed position, the deck of the first side frame is non-coplanar with the deck of the center frame.

E12. The hand truck according to any one of embodiments E1-E11, wherein in the closed position, a front side of the deck of the first side frame directly faces and is oriented essentially parallel to a front side of the deck of the second side frame.

E13. The hand truck according to any one of embodiments E1-E12, wherein a second side of the third side frame is hingedly attached to a first side of a fourth side frame movable between an open position and a closed position such that in the open position, the deck of the third side frame is essentially coplanar with a deck of the fourth side frame, and in the closed position the deck of the third side frame is non-coplanar with the deck of the center frame.

E14. The hand truck according to any one of embodiments E1-E13, wherein in the closed position, a front side of the deck of the third side frame directly faces and is oriented essentially parallel to a front side of the deck of the fourth side frame.

E15. The hand truck according to any one of embodiments E1-E14, wherein when all of the plurality of side frames are in the open position, the decks of the side frames and the deck of the center frame are essentially coplanar, and when all of the plurality of side frames are in the closed position, the decks of each side frame is essentially perpendicular to the deck of the center frame.

E16. The hand truck according to any one of embodiments E1-E15, wherein each side frame comprises at least one rear support attached to and extending away from a rear side of the corresponding side frame.

E17. The hand truck according to any one of embodiments E1-E16, wherein one or more of the side frames is removably hingedly attached to the center frame, to another side frame, or both.

E18. The hand truck according to any one of embodiments E1-E17, further comprising one or more connector holes, clasps, or engagement points dimensioned and arranged to allow releasable engagement between at least one additional hand truck along a top end, a bottom end or a side when all of the side frames of each hand truck are in their open positions.

E19. A hand truck comprising:
a plurality of frames, each defining a top end separated from a bottom end by a height;
each frame comprising a first side comprising a first side member separated from a second side comprising a second side member by a width, and further comprising at least one cross member extending between the first side member and the second side member, and a deck attached to a front side of one or more of the first side, the second side or the at least one cross member, dimensioned and arranged to cover at least a portion of the width and the height defined by the frame;
wherein one of the plurality of frames forms a center frame and comprises a wheel assembly attached to a rear side of the center frame, proximate to the bottom end and comprising at least one wheel adapted to facilitate a rolling movement of the hand truck over an external surface;
the remaining plurality of frames each forming one of a plurality of side frames;
wherein the first side of the center frame is hingedly attached to a second side of a first side frame and a first side of the first side frame is hingedly attached to a second side of a second side frame;
wherein the second side of the center frame is hingedly attached to a first side of a third side frame and a second side of the third side frame is hingedly attached to a first side of a fourth side frame;
wherein each of the side frames are moveable between an open position and a closed position such that in the open position, the deck of the center frame is essentially coplanar with the deck of each side frame, and in the closed position, the deck of the center frame is non-coplanar with the deck of each side frame;
wherein each of the frames have a total height of greater than or equal to about 48 inches; and
wherein the hand truck has a total width of less than or equal to about 30 inches when all of the side frames are in their respective closed positions, and wherein the hand truck has a total width of greater than or equal to about 70 inches when all of the side frames are in their respective open positions;

a swing out support frame having an upper end hingedly attached to the rear side of the center frame which is movable between an extended position and a stored position;

the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.

E20. A hand truck comprising:

a plurality of frames, each defining a top end separated from a bottom end by a height;

a first side comprising a first side member separated from a second side comprising a second side member by a width, and further comprising at least one cross member extending between the first side member and the second side member;

a deck attached to a front side of one or more of the first side, the second side or the at least one cross member, dimensioned and arranged to cover at least a portion of the width and the height defined by the frame;

wherein one of the plurality of frames forms a center frame and comprises a wheel assembly attached to a rear side of the center frame, proximate to the bottom end and comprising at least one wheel adapted to facilitate a rolling movement of the hand truck over an external surface;

each of the remaining plurality of frames forming side frames, wherein the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame; and wherein a first side of the first side frame is hingedly attached to a second side of a second side frame movable between an open position and a closed position such that in the open position, the deck of the first side frame is essentially coplanar with a deck of the second side frame, and in the closed position, the deck of the first side frame is non-coplanar with the deck of the center frame;

a swing out support frame having an upper end hingedly attached to the rear side of the center frame which is movable between an extended position and a stored position;

the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.

E21. A sofa dolly comprising:

a base defining a horizontal plane oriented parallel to a support surface, the base having a front side separated from a rear side by a depth and a right side separated from a left side by a width;

a plurality of vertical supports extending vertically away from the base having a lower support end engaged with the base separated from an upper support end by a height;

each of the supports further comprising a support arm having an inner arm end engaged with the upper support end and separated from an outer arm end by an arm length, the support arm positionable to extend away from the vertical support parallel to the horizontal plane of the base.

E22. The sofa dolly of embodiment E21, wherein the base comprises a plurality of rollers engaged with a lower face of the base and arranged between the support surface and the lower face.

E23. The sofa dolly of embodiment E21 or E22, wherein each of the support arms is rotationally engaged with and rotatable about the upper support end.

E24. The sofa dolly of any one of embodiment E21 through E23, wherein the lower end of a first vertical support is engaged with the base proximate to the right side of the base, and the lower end of a second vertical support is engaged with the base proximate to the left side of the base.

E25. The sofa dolly of any one of embodiment E21 through E24, wherein each of the vertical supports comprises an inner assembly bound by an outer assembly forming a releasably engageable telescoping assembly proximate to the upper end such that the height of each of the plurality of vertical supports may be varied.

E26. The sofa dolly of any one of embodiment E21 through E25, wherein each of the vertical supports are connected to each other with one or more horizontal stabilizers, preferably proximate to the upper support end oriented parallel with the rear side of the base.

E27. The sofa dolly of any one of embodiment E21 through E26, wherein each of the support arms are connected to each other with one or more support stabilizers oriented parallel to the base.

E28. The sofa dolly of any one of embodiment E21 through E27, wherein the inner support arm ends are connected to each other with a rear horizontal stabilizer, which is preferably arranged parallel to the base and/or the outer support arm ends are connected to each other with a front horizontal stabilizer, which is preferably arranged parallel to the rear side of the base.

E29. The sofa dolly of any one of embodiment E21 through E28, further comprising a lateral connector oriented parallel to and in between at least two of the vertical supports, engaged with the rear horizontal stabilizer, the front horizontal stabilizer, or both, having a connector length which is greater than or equal to a distance between the front and rear horizontal stabilizers, preferably greater than or equal to the arm length.

E30. The sofa dolly of any one of embodiment E21 through E29, wherein the lateral connector is dimensioned and arranged to receive and releasably engage a second lateral connector, dimensioned and arranged to join two such sofa dollies together via engagement of the second lateral connector with the lateral connector of both sofa dollies.

E31. The sofa dolly of any one of embodiment E21 through E30, wherein the base is the hand truck according to any one of embodiments E1-E20, and wherein the plurality of vertical supports are adapted to engage the deck and/or the side members of one or more of the frames.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

I claim:

1. A hand truck comprising:
   a plurality of frames, each defining a top end separated from a bottom end by a height;
   a first side comprising a first side member separated from a second side comprising a second side member by a width, and further comprising at least one cross member extending between the first side member and the second side member;
   a deck attached to a front side of one or more of the first side, the second side or the at least one cross member, dimensioned and arranged to cover at least a portion of the width and the height defined by the frame;
   wherein one of the plurality of frames forms a center frame and comprises a wheel assembly attached to a rear side of the center frame, proximate to the bottom end and comprising at least one wheel adapted to facilitate a rolling movement of the hand truck over an external surface;
   each of the remaining plurality of frames forming side frames, wherein the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame;
   wherein the second side of the center frame is hingedly attached to a first side of a third side frame; moveable between an open position and a closed position such that in the open position, the deck of the center frame is essentially coplanar with a deck of the third side frame, and in the closed position the deck of the center frame is non-coplanar with the deck of the third side frame;
   a swing out support frame having an upper end hingedly attached to the rear side of the center frame which is movable between an extended position and a stored position;
   the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.

2. The hand truck of claim 1, wherein the support frame has a width less than or equal to an inner width between the two side members of the center frame.

3. The hand truck of claim 1, wherein the support frame forms an angle of greater than about 20° and less than 45° when in the extended position.

4. The hand truck of claim 1, wherein the support frame is releasably engageable with the rear side of the center frame at a point between the upper end and the lower end of the support frame, which lockingly engages the support frame into the extended position.

5. The hand truck of claim 4, wherein the support frame comprises a locking arm hingedly attached to the support frame on a first end, and an open slot disposed through a second end dimensioned and arranged to engage a pin attached to the rear of the center frame.

6. The hand truck of claim 1, wherein the support frame further comprises one or more wheels adapted to facilitate a rolling movement of the hand truck over an external surface when in the extended position.

7. The hand truck of claim 1, further comprising one or more handles each extending away from and attached to the rear side of a corresponding side frame.

8. The hand truck of claim 1, further comprising two or more U-shaped supports comprising two vertical portions connected to a horizontal portion, each of the vertical portions having a first end releasably engaged with one or more frames, and/or the deck to extend away from the deck such that the horizontal portion is oriented essentially parallel to the deck between the two vertical portions;
   wherein the U-shaped support is dimensioned and arranged to removably engage the rear side of the frame such that the support is essentially coplanar with the side members when the first end of the support is not engaged with one or more frames, and/or the deck to extend away from the deck.

9. The hand truck of claim 8, wherein the U-shaped support, and has a width less than or equal to the width of the frame.

10. The hand truck of claim 8, wherein the U-shaped support removably engages the rear side of the frame via one or more pins, clips, or a combination thereof.

11. The hand truck of claim 1, wherein a first side of the first side frame is hingedly attached to a second side of a second side frame movable between an open position and a closed position such that in the open position, the deck of the first side frame is essentially coplanar with a deck of the second side frame, and in the closed position, the deck of the first side frame is non-coplanar with the deck of the center frame.

12. The hand truck of claim 1, wherein in the closed position, a front side of the deck of the first side frame directly faces and is oriented essentially parallel to a front side of the deck of the second side frame.

13. The hand truck of claim 1, wherein a second side of the third side frame is hingedly attached to a first side of a fourth side frame movable between an open position and a closed position such that in the open position, the deck of the third side frame is essentially coplanar with a deck of the fourth side frame, and in the closed position the deck of the third side frame is non-coplanar with the deck of the center frame.

14. The hand truck of claim 13, wherein in the closed position, a front side of the deck of the third side frame directly faces and is oriented essentially parallel to a front side of the deck of the fourth side frame.

15. The hand truck of claim 1, wherein when all of the plurality of side frames are in the open position, the decks of the side frames and the deck of the center frame are essentially coplanar, and when all of the plurality of side frames are in the closed position, the decks of each side frame is essentially perpendicular to the deck of the center frame.

16. The hand truck of claim 1, wherein each side frame comprises at least one rear support attached to and extending away from a rear side of the corresponding side frame.

17. The hand truck of claim 1, wherein one or more of the side frames is removably hingedly attached to the center frame, to another side frame, or both.

18. The hand truck of claim 1, further comprising one or more connector holes, clasps, or engagement points dimensioned and arranged to allow releasable engagement between at least one additional hand truck along a top end, a bottom end or a side when all of the side frames of each hand truck are in their open positions.

19. A hand truck comprising:
a plurality of frames, each defining a top end separated from a bottom end by a height;
each frame comprising a first side comprising a first side member separated from a second side comprising a second side member by a width, and further comprising at least one cross member extending between the first side member and the second side member, and a deck attached to a front side of one or more of the first side, the second side or the at least one cross member, dimensioned and arranged to cover at least a portion of the width and the height defined by the frame;
wherein one of the plurality of frames forms a center frame and comprises a wheel assembly attached to a rear side of the center frame, proximate to the bottom end and comprising at least one wheel adapted to facilitate a rolling movement of the hand truck over an external surface;
the remaining plurality of frames each forming one of a plurality of side frames;
wherein the first side of the center frame is hingedly attached to a second side of a first side frame and a first side of the first side frame is hingedly attached to a second side of a second side frame;
wherein the second side of the center frame is hingedly attached to a first side of a third side frame and a second side of the third side frame is hingedly attached to a first side of a fourth side frame;
wherein each of the side frames are moveable between an open position and a closed position such that in the open position, the deck of the center frame is essentially coplanar with the deck of each side frame, and in the closed position, the deck of the center frame is non-coplanar with the deck of each side frame;
wherein each of the frames have a total height of greater than or equal to about 48 inches; and
wherein the hand truck has a total width of less than or equal to about 30 inches when all of the side frames are in their respective closed positions, and wherein the hand truck has a total width of greater than or equal to about 70 inches when all of the side frames are in their respective open positions;

a swing out support frame having an upper end hingedly attached to the rear side of the center frame which is movable between an extended position and a stored position;
the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.

20. A hand truck comprising:
a plurality of frames, each defining a top end separated from a bottom end by a height;
a first side comprising a first side member separated from a second side comprising a second side member by a width, and further comprising at least one cross member extending between the first side member and the second side member;
a deck attached to a front side of one or more of the first side, the second side or the at least one cross member, dimensioned and arranged to cover at least a portion of the width and the height defined by the frame;
wherein one of the plurality of frames forms a center frame and comprises a wheel assembly attached to a rear side of the center frame, proximate to the bottom end and comprising at least one wheel adapted to facilitate a rolling movement of the hand truck over an external surface;
each of the remaining plurality of frames forming side frames, wherein the first side of the center frame is hingedly attached to a second side of a first side frame; moveable between an open position and a closed position such that in the open position, the deck of the center frame is essentially coplanar with a deck of the first side frame, and in the closed position the deck of the center frame is non-coplanar with the deck of the first side frame; and
wherein a first side of the first side frame is hingedly attached to a second side of a second side frame movable between an open position and a closed position such that in the open position, the deck of the first side frame is essentially coplanar with a deck of the second side frame, and in the closed position, the deck of the first side frame is non-coplanar with the deck of the center frame;
a swing out support frame having an upper end hingedly attached to the rear side of the center frame which is movable between an extended position and a stored position;
the support frame dimensioned and arranged such that when in the stored position, a lower end of the support frame is near and/or in contact with a cross member of the center frame and does not extend below the bottom of the center frame, and when in the extended position, the lower end of the support frame extends a distance away from the side members such that the support frame forms an angle of greater than about 10° and less than 90°, determined relative to the side members of the center frame.

\* \* \* \* \*